United States Patent
Kim et al.

(10) Patent No.: US 11,750,622 B1
(45) Date of Patent: Sep. 5, 2023

(54) FORWARDING ELEMENT WITH A DATA PLANE DDOS ATTACK DETECTOR

(71) Applicant: Barefoot Networks, Inc., Santa Clara, CA (US)

(72) Inventors: Changhoon Kim, Palo Alto, CA (US); Jeongkeun Lee, Mountain View, CA (US); Masoud Moshref Javadi, Sunnyvale, CA (US)

(73) Assignee: Barefoot Networks, Inc., Santa Clara, CA (US)

( * ) Notice: Subject to any disclaimer, the term of this patent is extended or adjusted under 35 U.S.C. 154(b) by 488 days.

(21) Appl. No.: 15/897,361

(22) Filed: Feb. 15, 2018

Related U.S. Application Data

(60) Provisional application No. 62/556,470, filed on Sep. 10, 2017, provisional application No. 62/554,024, filed on Sep. 5, 2017.

(51) Int. Cl.
| | | |
|---|---|---|
| *H04L 9/40* | (2022.01) | |
| *G06F 17/18* | (2006.01) | |
| *H04L 43/0876* | (2022.01) | |
| *H04L 41/0816* | (2022.01) | |

(52) U.S. Cl.
CPC .......... *H04L 63/1416* (2013.01); *G06F 17/18* (2013.01); *H04L 41/0816* (2013.01); *H04L 43/0876* (2013.01); *H04L 63/1458* (2013.01)

(58) Field of Classification Search
CPC ..... H04L 49/70; H04L 45/7453; H04L 43/16; H04L 41/0803; H04L 41/142; H04L 41/0866; H04L 41/0681; H04L 41/0813; H04L 63/00
See application file for complete search history.

(56) References Cited

U.S. PATENT DOCUMENTS

| | | |
|---|---|---|
| 7,804,774 B2 | 9/2010 | Yang et al. |
| 7,940,657 B2 | 5/2011 | Perreault et al. |
| 8,634,717 B2 | 1/2014 | Kang et al. |
| (Continued) | | |

OTHER PUBLICATIONS

'Moshref et al., Scream: Sketch Resource Allocation for Software-defined Measurement, Dec. 15, 2015, ACM, pp. 1-13 (Year: 2015).

(Continued)

*Primary Examiner* — Brian F Shaw
(74) *Attorney, Agent, or Firm* — Essential Patents Group, LLP; Christopher K. Gagne

(57) ABSTRACT

Some embodiments of the invention provide a forwarding element that has a data-plane circuit (data plane) that can be configured to implement a DDoS (distributed denial of service) attack detector. The data plane has several stages of configurable data processing circuits, which are typically configured to process data tuples associated with data messages received by the forwarding element in order to forward the data messages within a network. In some embodiments, the configurable data processing circuits of the data plane can also be configured to implement a DDoS attack detector (DDoS detector) in the data plane. In some embodiments, the forwarding element has a control-plane circuit (control plane) that configures the configurable data processing circuits of the data plane, while in other embodiments, a remote controller configures these data processing circuits.

20 Claims, 7 Drawing Sheets

(56) References Cited

U.S. PATENT DOCUMENTS

| | | | |
|---|---|---|---|
| 9,276,955 | B1 | 3/2016 | Jain |
| 9,413,783 | B1* | 8/2016 | Keogh ................ H04L 63/0227 |
| 10,181,912 | B1* | 1/2019 | Callaghan ............. H04L 49/555 |
| 2002/0032871 | A1 | 3/2002 | Malan et al. |
| 2004/0054924 | A1 | 3/2004 | Chuah et al. |
| 2006/0107318 | A1 | 5/2006 | Jeffries et al. |
| 2006/0272018 | A1 | 11/2006 | Fouant |
| 2007/0030850 | A1 | 2/2007 | Grosse |
| 2007/0130619 | A1 | 6/2007 | Reams |
| 2010/0220619 | A1 | 9/2010 | Chikira et al. |
| 2011/0072515 | A1 | 3/2011 | Park et al. |
| 2012/0151583 | A1 | 6/2012 | Kang et al. |
| 2012/0331160 | A1 | 12/2012 | Tremblay et al. |
| 2013/0003538 | A1 | 1/2013 | Greenberg et al. |
| 2013/0007880 | A1 | 1/2013 | Bosco et al. |
| 2013/0074183 | A1 | 3/2013 | Yoon |
| 2013/0117847 | A1 | 5/2013 | Friedman et al. |
| 2014/0317739 | A1* | 10/2014 | Be'ery ................... H04L 63/14 726/23 |
| 2015/0058976 | A1 | 2/2015 | Carney et al. |
| 2015/0207706 | A1* | 7/2015 | Li ........................ H04L 67/02 709/224 |
| 2016/0099964 | A1 | 4/2016 | Htay et al. |
| 2017/0085531 | A1 | 3/2017 | Song et al. |
| 2017/0149640 | A1* | 5/2017 | Narayanan .......... H04L 47/2483 |
| 2017/0251077 | A1 | 8/2017 | Eerpini et al. |
| 2017/0257388 | A1 | 9/2017 | Addepalli et al. |
| 2017/0272465 | A1 | 9/2017 | Steele |
| 2017/0318043 | A1 | 11/2017 | Shin et al. |
| 2018/0041524 | A1 | 2/2018 | Reddy et al. |
| 2018/0109556 | A1* | 4/2018 | Yoo ..................... H04L 63/1458 |
| 2020/0252435 | A1 | 8/2020 | Robertson et al. |

OTHER PUBLICATIONS

First Office Action for U.S. Appl. No. 15/897,366, dated Jan. 24, 2020, 32 pages.

Flajolet, Philippe, et al., "Hyperloglog: the analysis of a near-Optimal cardinality estimation algorithm," 2007, 20 pages, Discrete Mathematics and Theoretical Computer Science, Nancy, France.

Liu, Zaoxing, et al., "One Sketch to Rule Them All: Rethinking Network Flow Monitoring with UnivMon," SIGCOMM 16, Aug. 22-26, 2016, 14 pages, ACM, Florianopolis, Brazil.

Moshref, Masoud, et al., "SCREAM: Sketch Resource Allocation for Software-defined Measurement," CoNEXT 15, Dec. 1-4, 2015, 13 pages, ACM, Heidelberg, Germany.

Sharma, Naveen KR., et al., "Evaluating the Power of Flexible Packet Processing for Network Resource Allocation," 14th USENIX Symposium on Networked Systems Design and Implementation (NSDI'17), Mar. 27-29, 2017, 17 pages, USENIX, Boston, MA, USA.

Non-Published Commonly Owned U.S. Appl. No. 15/897,366, filed Feb. 15, 2018, 52 pages, Barefoot Networks, Inc.

First Office Action for U.S. Appl. No. 15/986,048, dated Dec. 31, 2020, 10 pages.

Hong, Sunghyuck. "Efficient and secure DNS cyber shelter on DDOS attacks." Nov. 26, 2014. Journal of Computer Virology and Hacking Techniques 11, 129-136 (Year: 2015).

Ijaz Ahmad et al., "Security in Software Defined Networks: A Survey", IEEE Communication Surveys and Tutorials, vol. 17, No. 4, Fourth Quarter 2015, pp. 2317-2346.

Notice of Allowance for U.S. Appl. No. 15/986,048, dated Apr. 28, 2021, 11 pages.

Office Action for U.S. Appl. No. 15/897,366, dated Sep. 4, 2020.

Office Action for U.S. Appl. No. 17/463,346, dated Oct. 20, 2022.

Bosshart, P., et al. , "Forwarding Metamorphosis: Fast Programmable Match-Action Processing in Hardware or SDN", SIGCOMM'13, Aug. 12-16, 2013, 12 pages, ACM, Hong Kong, China.

\* cited by examiner

FORWARDING ELEMENT WITH A DATA PLANE DDOS ATTACK DETECTOR

BACKGROUND

DDoS (Distributed Denial of Service) attacks make a service, machine, or network inaccessible to legitimate users by overloading their resources (network, CPU, memory, etc.) using superfluous requests generated from distributed sources. Such attacks cost millions of dollars for businesses by bringing services down, breaking the trust of customers, and enabling data breaches and other attacks. The complexity and scale of DDoS attacks are growing each year. They not only attack individual websites and government agencies, but also infrastructure services such as DNS and firewalls. Moreover, they can now originate from IoT (Internet of Things) devices (e.g., cameras), routers and even cloud.

DDoS attacks have profound implications for the cost of securing services and applications, risk profile, network architecture, and security deployments of Internet operators and Internet-connected enterprises. DDoS detection and mitigation solutions may take long and are expensive to scale to the exponentially increasing network traffic.

SUMMARY

Some embodiments of the invention provide a forwarding element that has a data plane circuit (data plane) that can be configured to implement a DDoS (distributed denial of service) attack detector. The data plane has several stages of configurable data processing circuits, which are typically configured to process data tuples associated with data messages received by the forwarding element, in order to forward the data messages within a network. However, in some embodiments, the configurable data processing circuits of the data plane can also be configured to implement a DDoS attack detector (DDoS detector) in the data plane. In some embodiments, the forwarding element has a control plane circuit (control plane) that configures the configurable data processing circuits of the data plane, while in other embodiments, a remote controller configures these data processing circuits.

The DDoS detector includes a storage (called tracked destination storage below) that stores one or more destinations to monitor. In this storage, each destination in some embodiments is specified by one or more message header parameters, such as a network address (e.g., an IP (Internet Protocol) address), a port address, and/or a protocol. Each of these addresses can be specified fully or partially in some embodiments. Also, in the tracked destination storage, each destination record in some embodiments can identify one destination machine (e.g., computer, virtual machine, container, etc.) or a cluster of destination machines (e.g., a group of webservers, database servers, etc.).

In some embodiments, a specified destination machine or a destination machine cluster can be a machine or a cluster that provides an infrastructure service (such as DNS, firewall, etc.), although this does not have to be the case (i.e., the machine or cluster does not have to provide an infrastructure service). Also, as further described below, some embodiments allow each destination record to include one or more parameters that fully or partially identify the sources of the data messages. Such information helps in identifying the source machines for a DDoS attack that is detected in the data plane. The control plane in some embodiments provides the description of the tracked destinations and/or sources to the DDoS detector (i.e., configures the tracked destination storage with the destination and/or source identifiers).

The DDoS detector in some embodiments includes a destination tracker that examines the messages received by the forwarding element to determine whether these messages are associated with the tracked destinations (also referred to below as monitored destinations). To perform this check for a received data message, the destination tracker in some embodiments compares the message's header values with the destination identifiers in the tracked destination storage.

In some embodiments, the DDoS detector also includes a statistics storage and a statistics generator that maintains statistics in the statistics storage about the number of data messages that are directed to the different tracked destinations. For instance, when a received data message is addressed to one of the tracked destinations (e.g., when the received message's header values match one of the stored destination identifiers in the tracked destination storage), the destination tracker in some embodiments directs the statistics generator of the DDoS detector to update statistics that it maintains in the statistics storage for that tracked destination.

In some embodiments, the statistics that the statistics generator stores and maintains are the number of times a tracked destination has been addressed by unique data message flows processed by the forwarding element. However, other embodiments do not maintain such statistics as it would require too much storage. Accordingly, in some embodiments, the statistics generator produces statistics that estimate the number of unique data message flows that are addressed to each tracked destination. In some embodiments, the DDoS detector can be configured to define unique message flows based on one or more different combinations of message header values. Typically, the definition of a message flow includes one or more source message attributes, such as source IP address, source port, source MAC, etc.

To generate estimates of unique data message flows that are directed to each tracked destination, the statistics generator generates one or more bit patterns from one or more header value parameters of a received message that is directed to a particular tracked destination. It then computes one or more values based on the generated bit pattern(s), and then uses the computed value(s) to update a set of one or more statistical estimates that the statistic generator previously stored for the particular tracked destination. The previously stored statistical estimates are an initialized set of values when the particular received message is a first message that is directed to the particular tracked destination following the previous time that the statics were initialized. Several examples of obtaining statistical estimates from generated bit patterns will be further described below.

The DDoS detector includes a statistics analyzer that processes the statistics stored for each tracked destination in order to determine whether the stored statistics indicate that the tracked destination has been accessed (actually or with a high probability) by data messages that emanate from a number of sources that exceed a threshold number. Like the tracked destinations, the threshold number is a number that the control plane provides to the DDoS detector (i.e., is a number that can be configured through the control plane).

When the statistics analyzer determines that the stored statistics for a tracked destination exceed the threshold for that tracked destination, the statistics analyzer generates a DDoS attack signal for the control plane circuit. In some embodiment, the control plane retrieves this signal (e.g., by periodically checking a register), while in other embodiments, the data plane proactively provides this signal, e.g., through a data-plane interface (e.g., through a PCIe interface of the data plane).

The data plane provides this DDoS attack signal in some embodiments by having a data message routed by the data plane's traffic manager to an egress port of the data plane that is associated with the data plane interface. For instance, in some embodiments, the DDoS detector is part of an ingress pipeline of the data plane. To route a DDoS attack signal that generated when a particular received message is processed, the statistics analyzer marks a data tuple (e.g., a header vector field) associated with the received message, and this marked tuple notifies the data plane's traffic manager to mirror the received message to the egress port associated with the data plane interface with a field marked in its header, to indicate that this message causes a threshold to be reached for a particular tracked destination. After the traffic manager generates a copy of this message for mirroring, an egress pipeline of the data plane then directs the mirrored copy of the message to the egress port associated with the data plane interface.

Once notified, the control plane can then configure the data plane to perform one or more actions with respect to the messages that it receives for the particular destination. These actions include (1) dropping these messages, (2) re-routing these messages to DDoS detection or mitigation appliances/servers, (3) mirroring these messages and directing the mirrored copies to the DDoS detection or mitigation appliances/servers, etc. In some embodiments, the control plane reconfigures the DDoS detector to collect additional information regarding the potential attack. The control plane in some embodiments performs an iterative data collection process in which it iteratively reconfigures the DDoS detector to iteratively collect attack related information with more granularity, in order to gain better insight into the attack (e.g., to identify the source or the destination of the attack with more precision). In some embodiments, the control plane can also set successive threshold levels regarding the message flows directed to a tracked destination that is potentially under attack.

As mentioned above, the statistics generator in some embodiments generates bit patterns from header values of data messages that are directed to a tracked destination, in order to identify an estimated number of times that the tracked destination has been addressed by unique data message flows. In some embodiments, the maintained statistical estimates calculate an estimated number of unique flows (e.g., source IPs or 5-tuple flows) for each particular tracked destination by using Approximate Cardinality Counter (ACC) data structure. ACC uses sketches (generated patterns) to approximate the number of unique items (e.g., source IPs) in a stream of packets using a very small amount of memory. For example, a HyperLogLog sketch tracks a pattern in the traffic and estimates the number of flows based on likelihood of the pattern.

In some embodiments, to generate such a sketch, the statistics generator uses numerous (e.g., 64, 100, 1000, etc.) hash generators to generate a multi-bit hash (e.g., 32-bit hash, 64-bit hash, etc.) from the source IP of the received data message that is directed to a particular tracked destination. In each hash value, the MSB (most significant bit) can be 1 for half of IP addresses, and 0 for the other half. In average, two source IP addresses are needed to observe a 1 in the MSB of a hash value. To observe a pattern of two 0s and then a 1, 8 source IPs are need on average. Thus, by keeping the maximum number of 0s before the first 1, a HyperLogLog sketch can approximate the number of unique source IPs, according to the following relationship: n leading-zeros in the sketch means that data messages with $2^{n+1}$ source IPs have been received for the particular tracked destination. This only requires five bits to count up to 4 billion IPs based on values generated by just one hash generator.

If the statistics generator uses only one hash generator, the error from the estimate that is based on one hash value can be large as the DDoS detector in the data plane, and can get extremely unlucky and get 32 leading 0s if the first message that it receives for a tracked destination produces such a hash. Thus, to improve the accuracy, the statistics generator in some embodiments uses multiple hash generators to produce multiple hash values (i.e., multiple bit patterns) and then produces an average leading-zero number from these hash values (i.e., computes $$\bar{n} = \frac{1}{m}\sum_{i=1}^{m} n_1,$$

where m is me number of hash generators).

For each particular hash generator, the statistics generator in some embodiments stores the largest leading-zero value n that it has seen for a particular tracked destination. Each time the particular hash generator produces a hash value with a new leading-zero value n that is larger than the previous leading-zero value n for a particular tracked destination, the statistics generator in some embodiments stores the new value as the new maximum leading-zero value n that it has seen thus far for the particular tracked destination and the particular hash generator.

Alternatively, instead of updating all leading-zero values for each hash generator that identifies a new maximum leading-zero value for a received data message that is directed to a particular tracked destination, the statistics generator only picks one hash generator (e.g., by using stochastic averaging) to update its maximum leading-zero value in order to slow down how quickly these maximum values of all the hash generators increment. Using this approach, the number of source IPs seen at any given time can be expressed as constant*m*$2^{\bar{n}}$ with relative error of $$\frac{1.3}{\sqrt{m}}$$

(LogLog algorithm). The error bound can be further improved to $$\frac{1.04}{\sqrt{m}}$$

by reducing the effect of outliers by using harmonic mean to calculate the average (HyperLogLog estimate).

Instead of computing an average of the maximum leading-zero values that are stored in the statistics storage for a particular tracked destination when processing a received messaged directed to that destination, the statistics analyzer computes a sum of these values in some embodiments and compares this sum to a threshold sum of these values. This approach allows the statistics analyzer to avoid performing a division operation, which is computationally more expensive than performing just a sum.

Moreover, to simplify the sum operation, the statistics analyzer of some embodiments maintains a running sum of maximum leading-zero values for each tracked destination. In these embodiments, each time the statistics generator updates the maximum leading-zero value for a tracked destination, it computes a difference value that expresses the difference between the new and previous leading-zero values for this destination, and provides this difference value to the statistics analyzer. This analyzer then updates the running sum for this tracked destination with this difference value. This approach allows the statistics analyzer to forego having to sum up all the current maximum leading-zero values for a particular tracked destination each time that the data plane receives a data message destined to this destination.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF FIGURES

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a forwarding element that has a data plane circuit (data plane) that can be configured to implement a DDoS (distributed denial of service) attack detector. The data plane has several stages of configurable data processing circuits, which are typically configured to process data tuples associated with data messages received by the forwarding element, in order to forward the data messages within a network. However, in some embodiments, the configurable data processing circuits of the data plane can also be configured to implement a DDoS attack detector (DDoS detector) in the data plane. In some embodiments, the forwarding element has a control plane circuit (control plane) that configures the configurable data processing circuits of the data plane, while in other embodiments, a remote controller configures these data processing circuits.

As used in this document, data messages refer to a collection of bits in a particular format sent across a network. One of ordinary skill in the art will recognize that the term data message may be used herein to refer to various formatted collections of bits that may be sent across a network, such as Ethernet frames, IP packets, TCP segments, UDP datagrams, etc. Also, as used in this document, references to L2, L3, L4, and L7 layers (or layer 2, layer 3, layer 4, and layer 7) are references respectively to the second data link layer, the third network layer, the fourth transport layer, and the seventh application layer of the OSI (Open System Interconnection) layer model.

Figure 1:
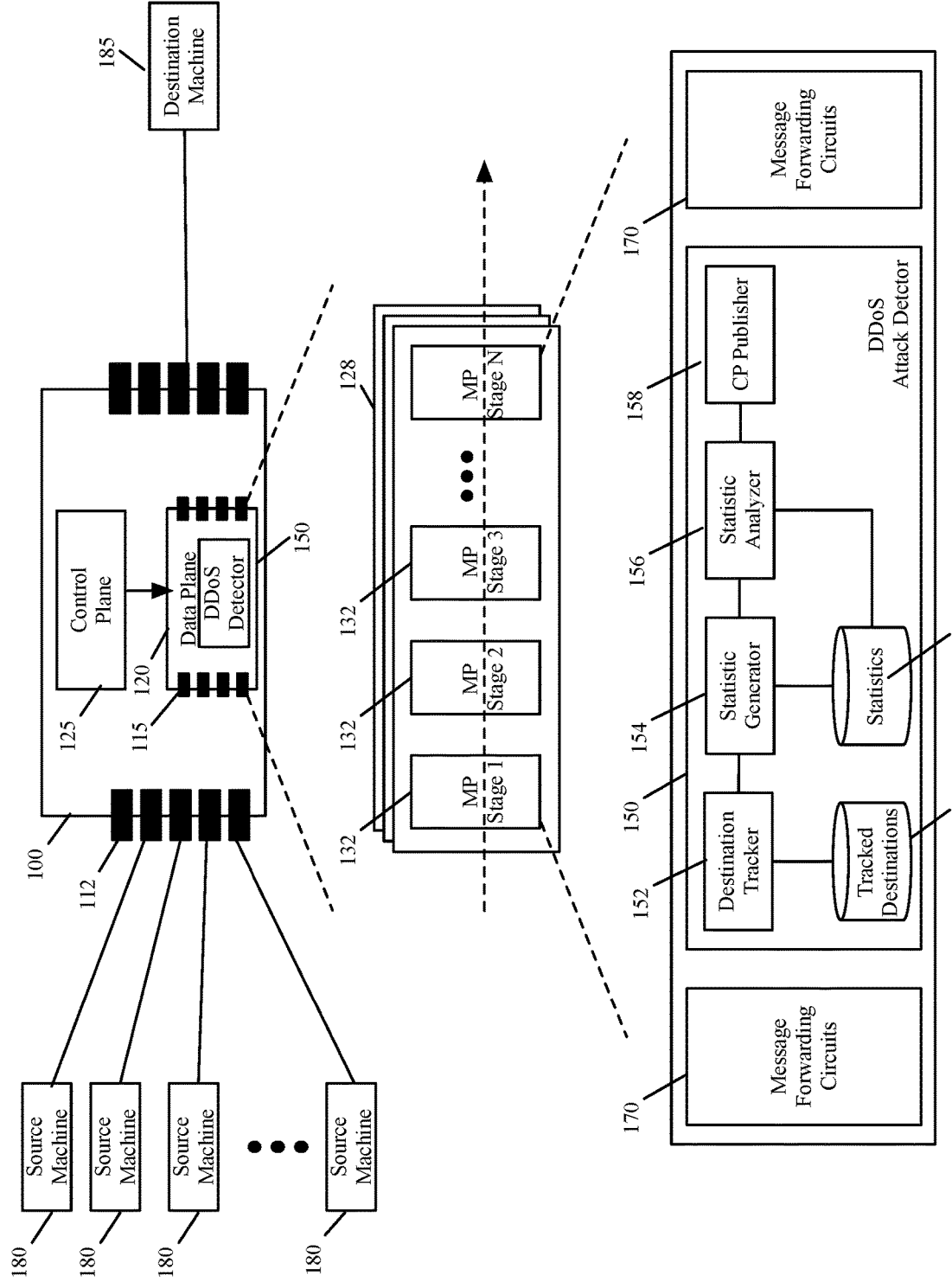
FIG. 1 illustrates a forwarding element of some embodiments that has a data plane circuit configured to implement a DDoS attack detector.

FIG. 1 illustrates an example of a forwarding element 100 of some embodiments that is not only used to forward data messages in a network, but is also used to detect DDoS attacks in its data plane. This forwarding element can be any type of forwarding element, such as a switch, a router, a bridge, etc. Also, this forwarding element can be deployed at an edge of the network to connect directly to host computers and/or standalone computers, or it can be deployed as a non-edge forwarding element in the interior of the network. The non-edge forwarding element forwards data messages between forwarding elements in the network (i.e., through intervening network fabric), while the edge forwarding element forwards data messages to and from edge compute device to each other, to other edge forwarding elements and/or to non-edge forwarding elements.

As shown, the forwarding element 100 includes a data plane circuit 120 (the "data plane"), a control plane circuit 125 (the "control plane"), and physical ports 112. The physical ports receive data messages from, and transmit data messages to, devices outside of the forwarding element 100. In some embodiments, the control plane 125 is implemented by one or more general purpose central processing units (CPUs), while the data plane 120 of the forwarding element is implemented by an application specific integrated circuit (ASIC) that is custom made to perform the data plane operations.

The data plane 120 performs the forwarding operations of the forwarding element 100 to forward data messages received by the forwarding element to other devices, while the control plane 125 configures the data plane. The data plane 120 also includes ports 115 that receive data messages to process, and transmit data messages after they have been processed. In some embodiments, some ports 115 of the data plane 120 are associated with the physical ports 112 of the forwarding element 100, while other ports 115 are associated with other modules of the control plane 125 and/or data plane 120.

The data plane includes several pipelines 128 of configurable message-processing (MP) stages 132 that can be configured to perform the data plane forwarding operations of the forwarding element to process and forward data messages to their destinations. These message-processing stages perform these forwarding operations by processing data tuples associated with the data messages received by the forwarding element, in order to determine how to forward the messages. In some embodiments, these data tuples are header vectors generated from the headers of the messages. Also, in some embodiments, the message-processing stages include match action units (MAUs) that try to match data tuples (e.g., values from the header vectors) of messages with table records that specify actions to perform on the data tuples.

In addition to processing messages as part of their forwarding operations, the message-processing stages 132 can be configured to implement a DDoS attack detector 150 in the data plane 120. This DDoS detector 150 in some embodiments can be configured by the control plane 125 or a remote controller (not shown) to monitor whether one or more destination machines are under a DDoS attack. As shown in FIG. 1, a DDoS attack is commonly carried out by multiple different source machines 180 transmitting a large number of unique data message flows to one destination machine 185 (e.g., to one webserver, application server, database server, one webserver cluster, application server cluster, or database server cluster, etc.), in a short duration of time.

Often, the data message flows are directed to an infrastructure service provided by the destination machine 185 (e.g., DNS service, firewall service, etc.), although this does not have to be the case (i.e., the machine or cluster does not have to provide an infrastructure service). These data message flows typically require the destination machine to perform operations and/or to provide reply messages, which consume the destination machine resources. Processing such operations and messages can cause the destination machine 185 to crash when it has to process a large enough number of unique data message flows in a short duration of time.

With its DDoS detector 150 tracking unique data message flows to one or more tracked destinations in the data plane, the forwarding element 100 can quickly detect potential DDoS attacks so that the forwarding element 100 can perform remedial actions in order to eliminate or mitigate the effects of such attacks. Specifically, by virtue of operating in the data plane 120, the DDoS detector 150 can track at the data plane line rate (i.e., at the rate at which the data plane processes data messages for forwarding) unique message flows directed to a tracked destination (also referred to as a monitored destination). Because of its operational speed, the DDoS detector 150 can identify a potential DDoS attack early, and hence it can notify the control plane 125 of such an attack earlier in its attack cycle. To detect a tracked destination under a DDoS attack, the DDoS detector in some embodiments generates statistics regarding unique data message flows to the tracked destination, and generates a DDoS attack signal when the maintained statistics exceed a threshold value in order to notify the control plane of the potential DDoS attack.

Once the DDoS detector 150 notifies the control plane 125 of the potential DDoS attack, the control plane 125 can perform one or more actions to address the situation. For instance, in some embodiments, the control plane 125 provides configuration data to the data plane 120 in order to reconfigure it to mirror data messages directed to the tracked destination to a DDoS detection/mitigation machine (e.g., VM, container, appliance, etc.) or cluster. Instead of mirroring these messages, the control plane 125 in other embodiments reconfigures the data plane 120 to redirect all these messages to the DDoS detection/mitigation machine/cluster (e.g., to change the next hop for all of these messages to be the DDoS detection/mitigation machine/cluster).

The data plane 120 in some embodiments encapsulates the mirrored or redirected data messages with an outer header that includes (1) the forwarding elements network address (e.g., its IP address) as the source network address of the encapsulated data message, and (2) the network address (e.g., its IP address) of the DDoS detection/mitigation machine as the destination network address of the encapsulated data message. In these embodiments, the data plane so encapsulates the mirrored or redirected data messages in order to preserve as much of the original header of the data message, so that the DDoS detection/mitigation machine can analyze this header. Also, in this outer header, the data plane in some embodiments includes other metadata that is useful for the DDoS detection/mitigation machine, such as forwarding element identifier, etc.

In some embodiments, the control plane reconfigures the DDoS detector to collect additional information regarding the potential attack. As further described below, the control plane 125 in some embodiments starts an iterative data collection process in which it iteratively reconfigures the DDoS detector to iteratively collect attack related information with more granularity in order to gain better insight into the attack (e.g., to identify the source or the destination of the attack with more precision). In some embodiments, the control plane 125 can also set successive threshold levels regarding the message flows directed to a tracked destination that is potentially under attack.

Before the DDoS detector identifies a potential attack of a tracked destination, the control plane 125 in some embodiments provides multiple traffic threshold levels for the tracked destination, so that the DDoS detector can provide different DDoS attack signals as its collected statistical data exceeds different threshold levels. In some embodiments, the control plane performs different remedial actions for different DDoS attack signals that correspond to different traffic threshold levels. Also, in some embodiments, the control plane reconfigures the data plane to drop the data messages directed to the tracked destination that is potentially under a DDoS attack.

In some such embodiments, the control plane reconfigures the data plane to drop such data messages only when a high enough traffic threshold level has been crossed. The control plane in some embodiments reconfigures the data plane to drop such data messages if they do not emanate from certain protected source machines. Alternatively, or conjunctively, the control plane reconfigures the data plane to drop such data messages if they emanate from certain source machines (e.g., machines outside of a particular address space).

The control plane 125 periodically resets the memory locations (i.e., to set the values stored in these locations to an initialized set of values) in which the DDoS detector 150 stores statistics regarding unique message flows directed to a particular tracked destination. In other embodiments, the data plane 120 is pre-configured to periodically reset these memory locations. In some embodiments, the DDoS detector's statistics memory locations are periodically or on-demand reset because the statistical data stored at these locations is only a valid estimate number of the unique message flows if this data is viewed over a particular duration of time. The statistical data becomes stale and inaccurate when it is examined over a larger duration of time. For example, as further described below, the statistical data in some embodiments is a bit pattern that the DDoS detector 150 generates to reflect the unique message flows directed to a tracked destination. This bit pattern provides an accurate estimate number of unique message flows to the tracked destination when it is used for a particular time duration. After that duration, the bit pattern becomes "dirtier and dirtier" as it represents unique message flows over longer and longer time periods, and thereby loses its value in providing an accurate estimate of the frequency of unique message flows.

As shown in FIG. 1, the DDoS detector 150 includes a destination tracker 152, a statistics generator 154, a statistics analyzer 156, a control plane (CP) publisher 158, a tracked destination storage 160, and a statistics storage 162. As shown, these components of the DDoS detector in some embodiments are implemented by the same components of the message processing stages 132 that perform the message forwarding operations of the data plane. The DDoS detector components are just the message-processing stage components that are configured (e.g., by the control plane 125) to perform DDoS operations instead of message forwarding operations.

FIG. 1 also shows message forwarding circuits 170 before and after the DDoS detector 150. The message forwarding circuits 170 conceptually represent the message processing stages 132 that perform the message forwarding operations in the data plane 120. These forwarding circuits can be before and/or after the DDoS detector 150 as the detector in some embodiments can be placed at any location in the data plane (i.e., can be implemented by the components of any set of one or more message processing stages 132).

In other embodiments, the DDoS detector has to be implemented by the message-processing stages of one or more ingress pipelines of the data plane 120. Specifically, in some embodiments, the message processing pipelines 128 of the data plane 120 include multiple ingress pipelines and multiple egress pipelines that are respectively placed before a traffic manager of the data plane 120. The traffic manager serves as a crossbar switch that directs messages between different ingress and egress pipelines. In some embodiments, the DDoS detector 150 is implemented by the message-processing stages of the ingress pipeline(s), as the DDoS detector uses message replication in the traffic manager to replicate a data message and direct the replicated data message to the control plane in order to pass data (e.g., a DDoS attack signal) to the control plane. In some such embodiments, an egress pipeline directs the replicated message to an egress port associated with a control/data plane interface from where the control plane receives data provided by the DDoS detector.

The tracked destination storage 160 stores one or more destinations to monitor. In this storage, each destination in some embodiments is specified by one or more message header parameters, such as a network address (e.g., an IP (Internet Protocol) address), a port address, and/or a protocol. Each of these addresses can be specified fully or partially in some embodiments. Also, in the tracked destination storage, each destination record in some embodiments can identify one destination machine (e.g., computer, virtual machine, container, etc.) or a cluster of destination machines (e.g., a group of webservers, database servers, etc.).

In some embodiments, a specified destination machine or destination machine cluster can be a machine or cluster that provides an infrastructure service (such as DNS, firewall, etc.), although this does not have to be the case (i.e., the machine or cluster does not have to provide an infrastructure service). Also, as further described below, some embodiments allow each destination record to include one or more parameters that fully or partially identify the sources of the data messages. Such information helps in identifying the source machines for a DDoS attack that is detected in the data plane. The control plane 125 in some embodiments provides the description of the tracked destinations and/or sources to the DDoS detector (i.e., configures the tracked destination storage with the destination and/or source identifiers).

The destination tracker 152 examines the messages received by the forwarding element to determine whether these messages are associated with the tracked destinations. To perform this check for a received data message, the destination tracker in some embodiments compares the message's header values (e.g., as reflected in the header vector of the message) with the destination identifiers in the tracked destination storage.

In some embodiments, the statistics generator 154 maintains statistics in the statistics storage 162 about the number of data messages that are directed to the different tracked destinations. When a received data message is addressed to one of the tracked destinations (e.g., when the received message's header vector matches one of the stored destination identifiers in the tracked destination storage 160), the destination tracker 152 in some embodiments directs the statistics generator 154 to update statistics that it maintains in the statistics storage for that tracked destination.

In some embodiments, the statistics that the statistics generator 154 stores and maintains in the storage 162 are the number of times a tracked destination has been addressed by unique data message flows processed by the forwarding element. However, other embodiments do not maintain such statistics as it would require too much storage. Accordingly, in some embodiments, the statistics generator 154 produces statistics that estimate the number of unique data message flows that are directed to each tracked destination. In some embodiments, the DDoS detector can be configured to define unique message flows based on one or more different combinations of message header values. Typically, the definition of a message flow includes one or more source message attributes, such as source IP address, source port, source MAC, etc.

To generate estimates of unique data message flows that are addressed to each tracked destination, the statistics generator generates one or more bit patterns from one or more header value parameters of a received message that is directed to a particular tracked destination. It then computes one or more values based on the generated bit pattern(s), and then uses the compute value(s) to update a set of one or more statistical estimates that the statistics generator previously stored for the particular tracked destination. The previously stored statistical estimates are an initialized set of values when the particular received message is a first message that is directed to the particular tracked destination following the previous time that the statics were initialized. Several examples of obtaining statistical estimates from generated bit patterns will be further described below by reference to FIGS. 2-4.

The statistics analyzer 156 processes the statistics stored for each tracked destination in order to determine whether the stored statistics indicate that the tracked destination has been accessed by an actual or estimated number of unique data message flows that exceeds a threshold number. Like the tracked destinations, the threshold number is a number that the control plane provides to the DDoS (i.e., is a number that can be configured through the control plane).

When the statistics analyzer 156 determines that the stored statistics for a tracked destination exceed the threshold for that tracked destination, the statistics analyzer 156 generates a DDoS attack signal for the control plane circuit, and the CP publisher 158 directs this attack signal to the control plane 125. In some embodiment, the CP publisher 158 provides this signal to the control plane 125 through a data plane interface (e.g., through a PCIe interface of the data plane). In other embodiments, the control plane retrieves the DDoS attack signal (e.g., by periodically checking a register that the statistic analyzer 156 or the CP publisher 158 populates).

In some embodiments, the CP publisher 158 provides the DDoS attack signal to the control plane by having a data message routed by the data plane's traffic manager to an egress port of the data plane that is associated with the data plane interface. For instance, as mentioned above, the DDoS detector in some embodiments is implemented in one or all of the ingress pipelines of the data plane. To route a DDoS attack signal that generated when a particular received message is processed, the statistics analyzer in some embodiments marks a data tuple (e.g., a header vector field) associated with the received message, and this marked tuple notifies the data plane's traffic manager to mirror the received message to the egress port associated with the data plane interface with a field marked in its header to indicate that this message cause a threshold to be reached for a particular tracked destination. After the traffic manager generates a copy of this message for mirroring, an egress pipeline of the data plane then directs the mirrored copy of the message to the egress port associated with the data plane interface. In these embodiments, the CP publisher functionality is implemented by the traffic manager, the egress pipeline, and the data plane interface.

The mirrored message that is provided to the control plane identifies the tracked destination that is apparently under a DDoS attack (i.e., that has exceeded its threshold). In some embodiments, the DDoS detector (e.g., the statistics analyzer or the CP publisher) stores an identifier in this message that explicitly identifies this tracked destination. In other embodiments, the control plane extrapolates this identifier by comparing the attributes of the received data message with the tracked destination definitions that it stores.

Once notified, the control plane can then configure the data plane to perform one or more actions with respect to the messages that it receives for the particular destination. These actions include (1) dropping these messages, (2) re-routing these messages to DDoS detection or mitigation appliances/servers, and (3) mirroring these messages and directing the mirrored copies to the DDoS detection or mitigation appliances/servers, etc.

As mentioned above, the statistics generator 154 in some embodiments generates bit patterns from header values of data messages that are directed to a tracked destination, in order to identify an estimated number of times that the tracked destination has been addressed by unique data message flows. In some embodiments, the maintained statistical estimates represent an estimated number of unique flows (e.g., source IPs, 5-tuple flows) for each particular tracked destination, calculated by using Approximate Cardinality Counter (ACC) data structure. ACC uses sketches (generated patterns) to approximate the number of unique items (e.g., source IPs) in a stream of packets using a very small amount of memory. For example, a HyperLogLog sketch tracks a pattern in the traffic and estimates the number of flows based on likelihood of the pattern.

In some embodiments, to generate such a sketch, the statistics generator uses numerous (e.g., 64, 100, 1000, etc.) hash generators to generate a multi-bit hash (e.g., 32-bit hash, 64-bit hash, etc.) from the source IP of the received data message that is directed to a particular tracked destination. In each hash value, the MSB (most significant bit) can be 1 for half of IP addresses, and 0 for the other half. In average, two source IP addresses are needed to observe a 1 in the MSB of a hash value. To observe a pattern of two 0s and then a 1, 8 source IPs are need on average. Thus, by keeping the maximum number of 0s before the first 1, a HyperLogLog sketch can approximate the number of unique source IPs, according to the following relationship: n leading zeros in the sketch means that data messages with $2^{n+1}$ source IPs have been received for the particular tracked destination. This only requires five bits to count up to 4 billion IPs based on values generated by just one hash generator.

If the statistics generator uses only one hash generator, the error from the estimate that is based on one hash value can be large as the DDoS detector in the data plane, and can get extremely unlucky and get 32 leading 0s if the first message that it receives for a tracked destination produces such a hash. Thus, to improve the accuracy, the statistics generator in some embodiments uses m hash generators to produce multiple hash values (i.e., multiple bit patterns) and then produces an average leading-zero number from these hash values (i.e., computes $$\bar{n} = \frac{1}{m}\sum_{i=1}^{m} n_1,$$

where m is the number of hash generators).

For each particular hash generator, the statistics generator in some embodiments stores the largest leading-zero value n that it has seen for a particular tracked destination. Each time the particular hash generator produces a hash value with a new leading-zero value n that is larger than the previous leading-zero value n for a particular tracked destination, the statistics generator in some embodiments stores the new value as the new maximum leading-zero value n that it has seen thus far for the particular tracked destination and the particular hash generator.

Alternatively, instead of updating all leading-zero values for each hash generator that identifies a new maximum leading-zero value for a received data message that is directed to a particular tracked destination, the statistics generator only picks one hash generator (e.g., by using stochastic averaging) to update its maximum leading-zero value in order to slow down how quickly these maximum values of all the hash generators increment. Using this approach, the statistics analyzer 156 estimates the number of source IPs seen at any given time by using the following equation:

$$\text{constant} * m * 2^{\bar{n}}.$$

This equation has a relative error of $$\frac{1.3}{\sqrt{m}}$$

(LogLog algorithm). The error bound can be further improved to $$\frac{1.04}{\sqrt{m}}$$

by reducing the effect of outliers by using harmonic mean to calculate the average (HyperLogLog estimate).

Figure 2:
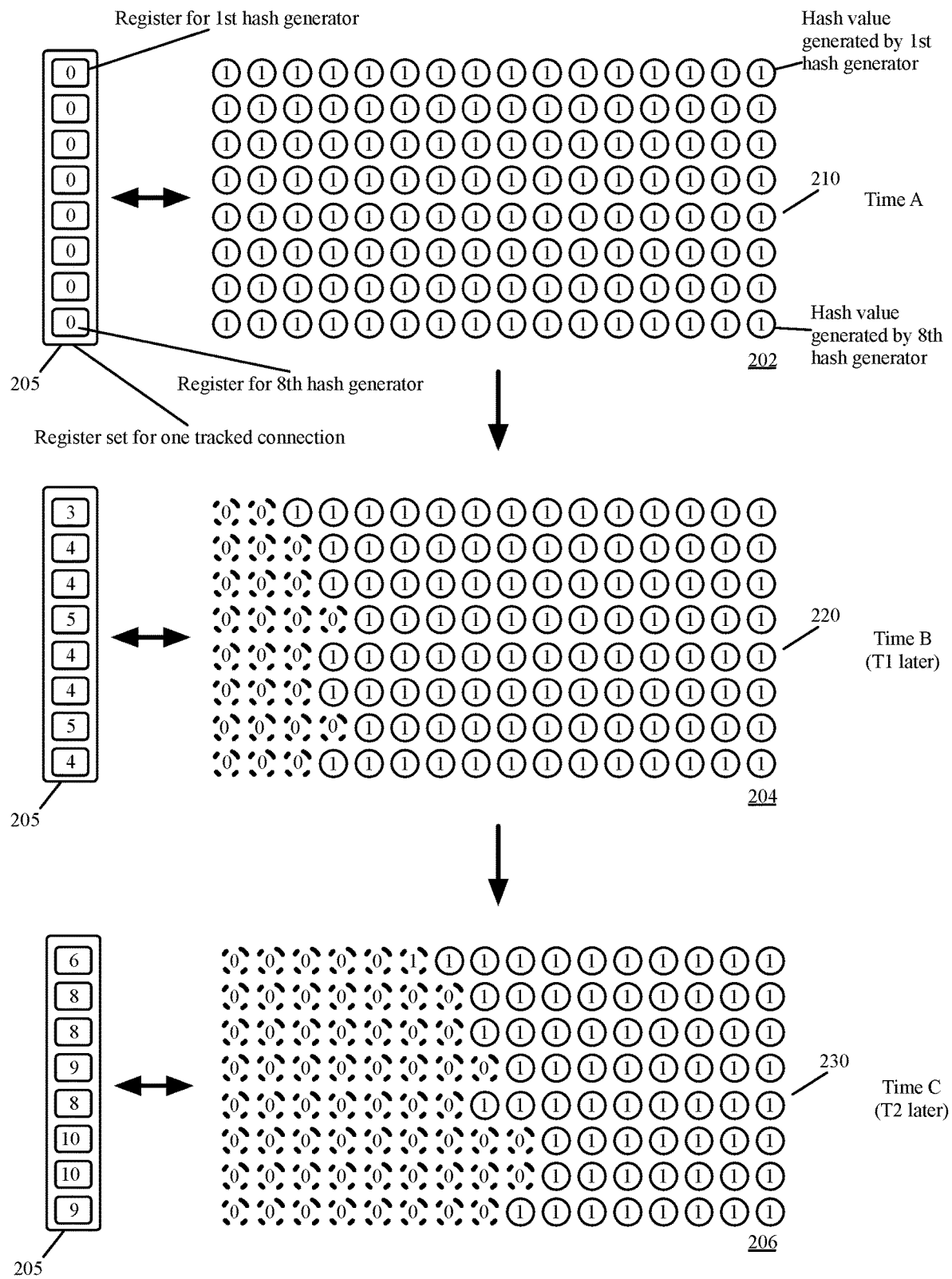
FIG. 2 illustrates a more detailed view of the DDoS attack detector of the data plane circuit of some embodiments.

FIG. 2 presents an example that illustrates a bit pattern generated and updated by the statistics generator 154 of some embodiments. This example is illustrated in three stages 202, 204 and 206. Each stage shows (1) a set of values that the statistics generator 154 stores in a set of registers 205 at a particular instance of time, and (2) the bit pattern corresponding to this set of values. Each bit pattern includes m rows of p hash bits that are generated by m hash generators, where p and m are integers. In FIG. 2, m equals 8 and p equals 16 in order to simplify the illustration in this figure, but in other embodiments these values are much larger, e.g., m equals 64, 100, or 1000, while p equals 32 or 64. In fact, m cannot be less than 16 in some embodiments.

In FIG. 2, each row of bits is a hash value generated by one of the hash generators. The value stored in the register 205 for each row stores a leading-zero value n that in some embodiments is computed as one plus the number of MSB zeroes before the first MSB one. At any given time, the leading-zero value stored in a hash generator's register 205 in some embodiments is a current maximum leading-zero value that has been generated thus far by the hash generator for the data message flows that have matched the tracked destination associated with the bit pattern.

The first stage 202 shows the register values and the bit pattern at the time that the control plane has initialized DDoS detector 150. As shown, all the bits are set to 1 and all registers store 0 in this stage 202 as the DDoS detector has not processed any data messages for any of the tracked destinations. The second stage 204 shows the register values and the bit pattern a time period T1 after the DDoS detector has processed a number of data messages. At this stage, the register values are 3, 4, 4, 5, 4, 4, 5, and 4, which corresponds to the bit pattern 220. The average register value equals to 4.125, which leads to the statistics analyzer 156 computing an estimate of 140 unique flows when it uses equation $m*2^{\bar{n}}$. When a constant of 0.345 is used in the formulation constant$*m*2^{\bar{n}}$, the estimate of unique flows is 48.3.

The third stage 206 shows the register values and the bit pattern a time period T2 after the DDoS detector has processed even more data messages. At this stage, the register values are 6, 8, 8, 9, 8, 10, 10, and 9, which corresponds to the bit pattern 230. The average register value equals to 8.5, which leads to the statistics analyzer 156 computing an estimate of 2,896 unique flows when it uses equation $m*2^{\bar{n}}$. When a constant of 0.345 is used in the formulation constant$*m*2^{\bar{n}}$, the estimate of unique flows is 999.1.

The control plane 125 in some embodiments periodically resets the values in the registers 205. Before the control plane resets these values, the DDoS detector 150 in some embodiments generates a DDoS attack signal when the values in the leading-zero max registers 205 produce an estimate of unique flows that exceeds a threshold value. In some embodiments, the statistics analyzer 156 generates an average of the values stored in the max registers for a tracked destination and determines whether this average exceeds a threshold value.

However, instead of computing an average of the maximum leading-zero values that are stored in the statistics storage (e.g., in the max register set 205) for a particular tracked destination when processing a received messaged directed to that destination, the statistics analyzer 156 computes a sum of these values in some embodiments and compares this sum to a threshold sum of these values. This approach allows the statistics analyzer to avoid performing a division operation, which is computationally more expensive than performing just a sum.

Moreover, to simplify the sum operation, the statistics analyzer of some embodiments maintains a running sum of maximum leading zero values for each tracked destination. In these embodiments, each time the statistics generator updates the maximum leading-zero value for a tracked destination, it computes a difference value that expresses the difference between the new and previous leading-zero values for this destination, and provides this difference value to the statistics analyzer. This analyzer then updates the running sum for this tracked destination with this difference value. This approach allows the statistics analyzer to forego having to sum up all the current maximum leading-zero values for a particular tracked destination each time that the data plane receives a data message destined to this destination.

Figure 3:
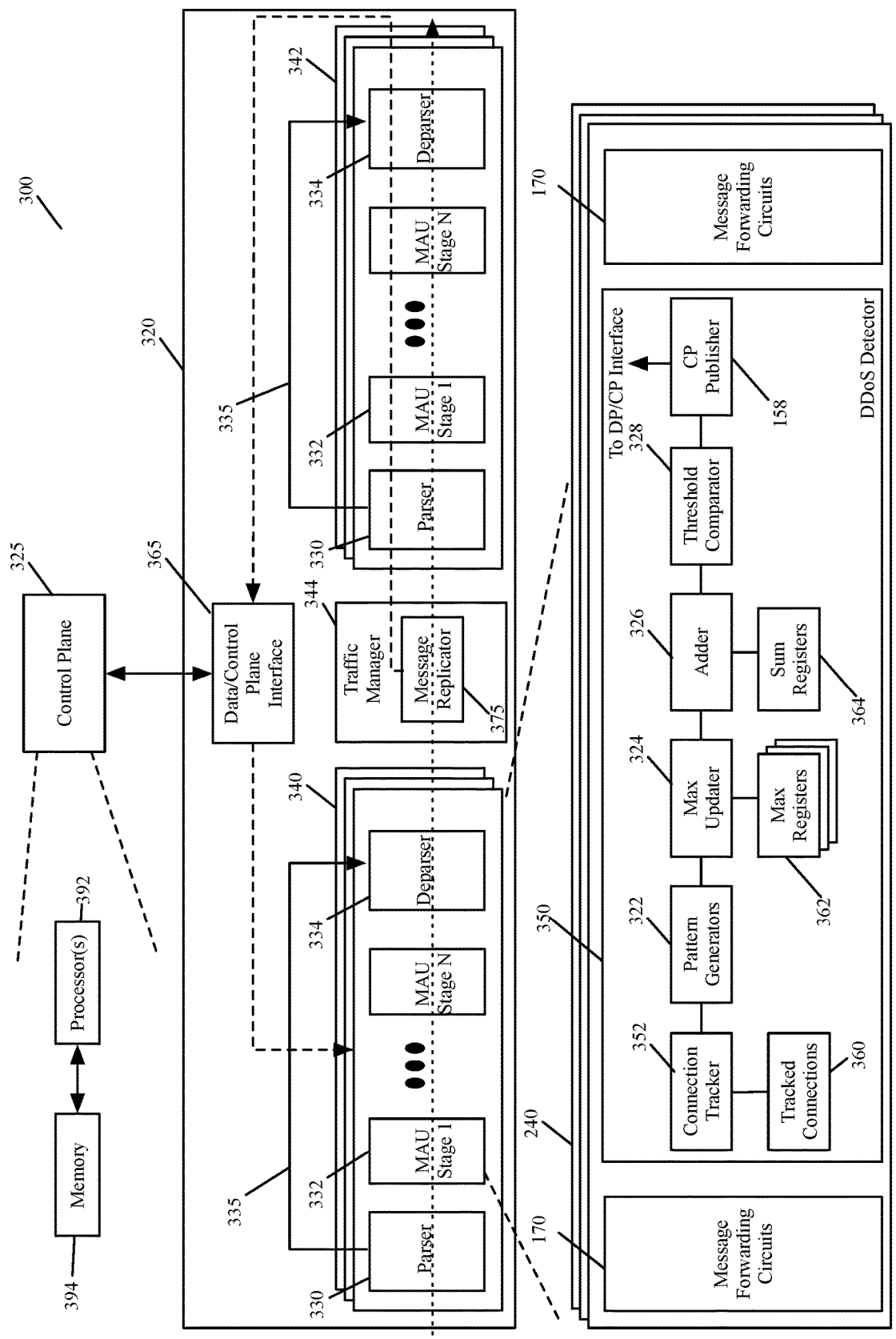
FIG. 3 illustrates an example of a bit pattern created by a pattern generator of the DDoS detector of FIG. 2.

FIG. 3 illustrates a more detailed example of a DDoS detector 350 of some embodiments. This figure also provides more detailed examples of a data plane 320 and a control plane 325 of a forwarding element 300 of some embodiments. The control plane 325 includes one or more processors 392 (such as a microprocessor with multiple processing cores or units) that execute instructions, and a memory 394 that stores instructions. These instructions can be specified by (1) a manufacturer of the network forwarding element that uses the forwarding element 300, (2) a network administrator that deploys and maintains the network forwarding element, or (3) one or more automated processes that execute on servers and/or network forwarding elements that monitor network conditions. A processor 392, or another circuit of the control plane, communicates with the data plane (e.g., to configure the data plane or to receive statistics from the data plane) through a control/data plane interface 365.

As shown, the data plane 320 includes multiple message-processing pipelines, including multiple ingress pipelines 340 and egress pipelines 342. The data plane 320 also includes a traffic manager 344 that is placed between the ingress and egress pipelines 340 and 342. The traffic manager 344 serves as a crossbar switch that directs messages between different ingress and egress pipelines.

Each ingress/egress pipeline includes a parser 330, several MAU stages 332, and a deparser 334. A pipeline's parser 330 extracts a message header from a data message that the pipeline receives for processing. In some embodiments, the extracted header is in a format of a header vector (HV) that is processed, and in some cases modified, by successive MAU stages 332 as part of their message processing operations. The parser of a pipeline 330 passes along a bypass path 335 the payload of the message to the pipeline's deparser 334 as the pipeline's MAU 332 operates on the header vectors. In some embodiments, the parser also passes the message header to the deparser 334 along with the payload (i.e., the parser passes along the bypass path 335 the entire message to the deparser).

When a pipeline 340/342 finishes processing a data message, the message has to be provided to the traffic management stage (in case of an ingress pipeline) or to a port 115 (in case of an egress pipeline) to be forwarded to the message's next hop (e.g., to its destination compute node or next forwarding element) or to another module of the data or control plane. Accordingly, at this stage, the deparser 334 of the pipeline in some embodiments produces the data message header from the message's header vector that was processed by the pipeline's last MAU stage, and combines this header with the data message's payload. In some embodiments, the deparser 334 uses part of the header received from the parser 330 of its pipeline to reconstitute the message from its associated header vector.

In some embodiments, one or more MAU stages 332 of each ingress pipeline are configured to implement the components of the DDoS detector 350. As shown, these components include a connection tracker 352, a tracked connection storage 360, a bit pattern generator 322, a max updater 324, several groups of max register sets 362, an adder 326, several sum registers 364, a threshold comparator 328 and a control plane (CP) publisher 158.

The DDoS detector 350 components are implemented in the ingress pipelines as this detector's CP publisher uses a message replicator 375 of the traffic manager 344 to replicate data messages, embed DDoS attack signs in these messages, and direct these data messages (through an egress pipeline) to the data/control plane interface 365 for supplying to the control plane. Also, in some embodiments, the DDoS detector 350 is configured to operate in each of the ingress pipelines 340 because the forwarding element's parser 330 might initially direct DDoS data messages through any of the ingress pipeline stages 340.

The connection tracker 352 and tracked connection storage 360 are similar to the destination tracker 152 and the tracked destination storage 160 of FIG. 1, except that the tracker 352 and storage 360 track and store connections for different monitored destinations rather than just tracking and storing the different monitored destinations. Like the monitored destinations, each stored and tracked connection is defined by a full or partial destination address (e.g., a full or partial destination IP address and/or destination port address). However, each stored and tracked connection can also be defined by a full or partial source attributes that identify the source or a set of sources of one or more data message flows to the monitored destination.

The source information allows flows to any monitored destination to be further tracked by one or more source attributes in order to identify the source or a set of sources, of a DDoS attack that is directed to the monitored destination. In some embodiments, the control plane employs an iterative, search-graph based approach to further define the source identifier set of a tracked connection in storage 360 in multiple iterative stages, in order to identify the source or set of sources for a DDoS attack. Several such iterative, graph based approaches will be further described below.

The pattern generator 322 and the max updater 324 implement the statistics generator 154 of some embodiments, while the adder 326 and threshold comparator 328 implement the statistics analyzer 156 of some embodiments. These four components implement the data plane thresholding technique of some embodiments. As described above, for each received data message that matches one of the tracked connection records in the storage 360, this technique (1) uses several hash generators (e.g., 64, 100, or 1000 hash generators) in one or more MAU stages to identify a bit pattern for the data message, (2) identifies a leading-zero number for each generated hash value, (3) if at least one leading-zero number is a new maximum number for a hash, stores one of the maximum leading-zero numbers, (4) increments a running sum of leading-zero numbers in the bit pattern based on a delta value generated from the stored maximum, and (5) performs a thresholding operation based on the incremented sum. When the sum crosses a threshold, the threshold comparator 328 generates a DDoS attack signal that the CP publisher 158 forwards to the control plane 325 through the interface 365.

Figure 4:
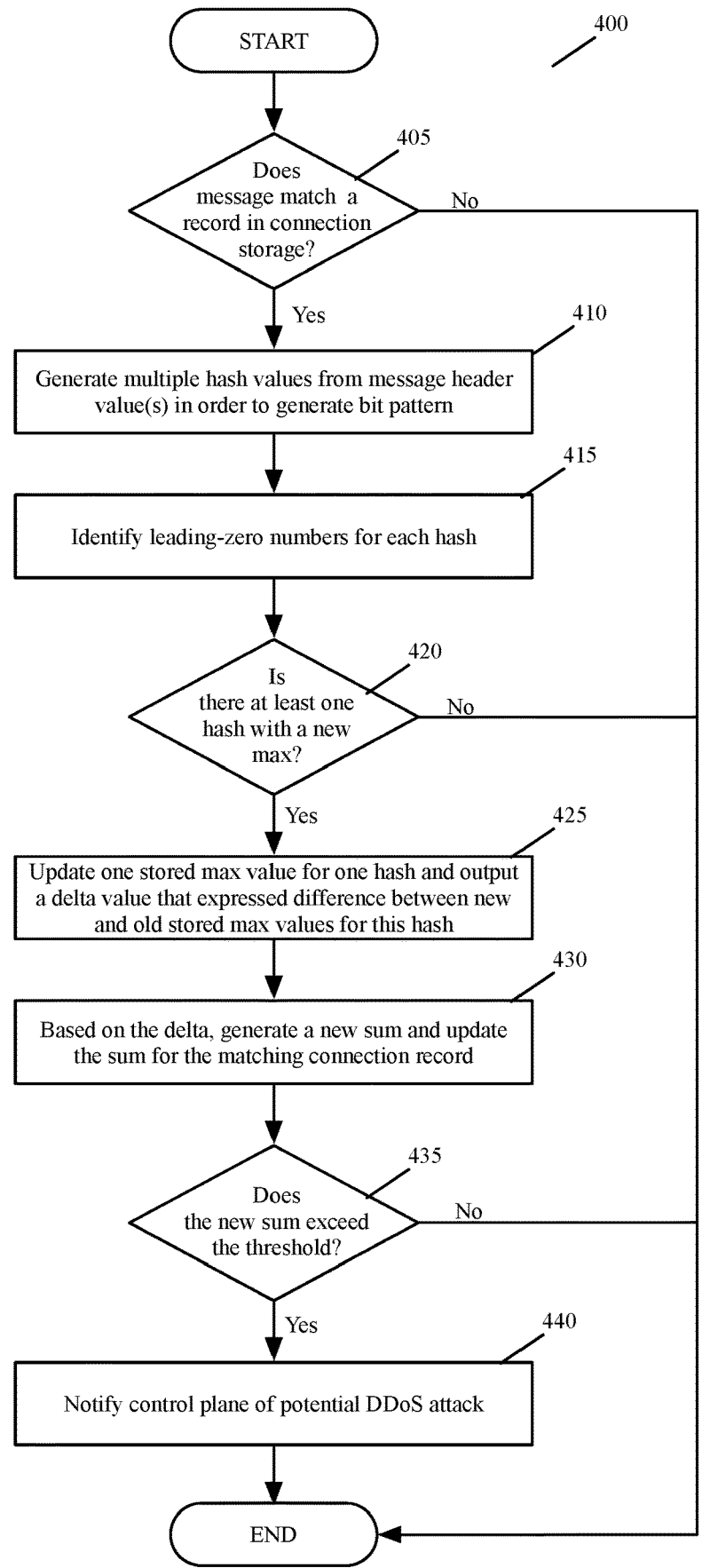
FIG. 4 illustrates a process that the data plane of FIG. 2 performs to detect and report a DDoS attack.

To further describe this data-plane thresholding technique, FIG. 4 presents a process 400 that illustrates how the components of the DDoS detector 350 process a data message by the data plane 320. In some embodiments, each of the operations of this process is a conceptual representation of a logical operation that is performed by one or more match action units that implement one or more of the components of the DDoS detector 350 of FIG. 3.

As shown, the connection tracker 352 initially determines whether the received data message matches one of the tracked connections in the tracked connection storage 360. In some embodiments, the connection tracker 352 performs this operation by comparing the tracked connection identifiers (e.g., the layer 2, 3, or 4 attributes that define the tracked connections) with a set of values in the header vector associated with the received data message.

As mentioned above, a parser 330 generates this header vector for a received data message and embeds one or more header values (e.g., the five tuple identifiers, source MAC address, destination MAC address, etc.) of the received data message in this header vector for the MAU stages 332 of the ingress and egress pipelines 340 and 342 to analyze and modify as they process the header vector. In some embodiments, the tracked connection identifiers are defined in terms of a set of one or more destination identifiers, such as destination IP address, destination port address, etc. As further described below, a tracked connection identifiers in some embodiments can also be specified in terms of a set of one or more source identifiers (e.g., source IP address, source port address, etc.), protocol, etc. Moreover, a tracked connection identifier can be defined by reference to a partially defined attribute, e.g., a tracked connection can be expressed by reference to a partially defined destination IP address that coves a range of IP address. For example, a destination IP address can be as 195.162.10.*, which covers all IP addresses that fall within the set of IP addresses that share the same starting 24 bits (195.162.10).

If the connection tracker 352 determines (at 405) that the header vector of the received message does not match the identifier of any tracked connection in the tracked connection storage 360, the process ends, as the received message is not associated with a connection that the DDoS detector 350 is configured to track. On the other hand, when the header vector matches one of the tracked connection identifiers in the tracked connection storage 360, the connection tracker 352 marks the header vector to direct several hash generators in one or more subsequent MAU stages 332 (i.e., in one or more MAU stages that are after the MAU stage that implements the connection tracker 352) to generate several hash values that define a bit pattern. In some embodiments, this marking also directs subsequent DDoS detector components (324, 326 and 328) to process the header vector in order to perform their DDoS detection operations.

In response to this direction, the hash generators generate (at 410) several hash values from one or more message header attributes (e.g., from the source IP address, source port address, and/or protocol) in the received message's associated header vector. These hash values collectively represent a bit pattern, as described above by reference to bit patterns 220 and 230 of FIG. 2. Next, at 415, the max updater 324 generates leading-zero values for each hash value generated by each hash generator. As described above, some embodiments compute the leading-zero value for a hash as one plus the number of MSB zeroes before the first MSB one. To perform this operation, some embodiments use TCAMs (ternary content-addressable memories).

For each tracked connection, the max updater 324 maintains a set of registers 205 in the max registers 362. Each register in a connection's register set corresponds to one hash generator. For each tracked connection, the set of registers 205 stores the maximum leading-zero values of all the hash values generated thus far for the tracked connection by the hash generators. As mentioned above by reference to bit pattern 210 of FIG. 2, some embodiments initialize all the registers in a register set 205 to store a value 1.

Accordingly, after computing the leading-zero values for each generated hash value, the max updater 324 determines (at 420) whether at least one generated hash value (i.e., at least one row in the generated bit pattern) has a computed leading-zero value that is larger than the leading-zero value stored in the register set 205 for the hash generator that generated that hash value. Again, the register set 205 that is examined (at 420) is the register set that the max updater maintains for the tracked connection that matched (at 405) the received message.

When no leading-zero value computed (at 415) is larger than its corresponding value that is stored in the register set 205 for its hash generator and its tracked connection, no other DDoS detection operations need to be performed as the sum of the connection's stored leading-zero values has not increased. Thus, in this situation, the max updater marks (at 420) the header vector to indicate that no other DDoS detector operations are needed for the received data message, and the process 400 ends.

On the other hand, when at least one generated hash value has a computed leading-zero value that is larger than the leading-zero value stored in the matching connection's register set 205 for the hash generator that generated that hash value, the max updater 324 selects (at 425) one of the hash values (i.e., selects one of the hash generators) that has a computed leading-zero value that is larger than its corresponding stored leading-zero value. When only one hash value results in a larger computed leading-zero value, the max updater 324 just selects that hash value. The max updater 324 then stores (at 425) the computed leading-zero value for the selected hash value (i.e., for the selected hash generator) in its corresponding register in the register set 205 of the matching tracked connection (i.e., for the tracked connection identified at 405).

At 425, the max updater also computes a delta value that corresponds to the difference between the value stored (at 425) in the register of the selected hash generator and the previous value that was stored in this register. For example, when a register for a hash generator previously stored 6 as a max leading-zero value and the max updater replaces this value with an 8, the max updater computes 2 as the delta value. At 425, the max updater embeds the delta value in the header vector of the received message, so that the adder 326 can increment the running leading-zero sum value that it maintains for the matching tracked connection.

Specifically, in the register storage 364, the adder 326 maintains a sum register for each tracked connection in the tracked connection storage 360. Each tracked connection's sum register maintains a running sum of the leading-zero values stored in the register set 205 for that tracked connection. Thus, when the adder 326 receives a delta value from the max updater 324 for the matching tracked connection identified at 405, the adder adds (at 430) this delta value to the value stored in the register for this tracked connection and stores the result of this sum back into this sum register.

Next, at 435, the threshold comparator 328 determines whether the result of this sum is greater than a threshold value for the tracked connection. In some embodiments, the adder 326 then provides the result of this sum to the comparator 328 by embedding (at 430) this result in the header vector, as the comparator is implemented by the components of a subsequent MAU stage. In these embodiments, the comparator then retrieves the result of the sum from the header vector to perform its threshold comparison operation. In other embodiments, the comparator 328 retrieves this result from the sum register that the adder updates at 430.

In some embodiments, the control plane 325 configures the threshold values that the comparator uses for its threshold comparisons for the tracked connections. In some of these embodiments, the control plane 325 configures different threshold values for different tracked connections, while in other embodiments, the control plane 325 configures the same threshold value for some or all the tracked connections.

When the comparator determines (at 435) that the sum value computed by the adder 326 does not exceed the tracked connection's threshold value, the process 400 ends without the comparator generating a DDoS attack signal. However, when the comparator determines (at 435) that this sum value exceeds the tracked connection's threshold value, the comparator generates (at 440) a DDoS attack signal, which the CP publisher 158 forwards (at 440) to the control plane 325.

In some embodiments, the comparator 328 generates (at 440) the DDoS attack signal by marking a field in the header vector of the received message. This marked field is then passed to the traffic manager 344 as a marked value in the data message header produced by the deparser 334 of the DDoS detector's associated ingress pipeline. This marked value then causes a message replicator 375 of the traffic manager 344 to replicate the data message, insert the DDoS attack signal in the replicate message, and direct this replicate message to the egress port 115 associated with the data/control plane interface 365.

In some embodiments, the messages that are sent to this egress port are processed by one of the egress pipelines 342 and are forwarded to the interface 365, from where the message is provided to the control plane. Typically, the format of the message is modified (e.g., by the data/control plane interface 365) before it is provided to the control plane 325. Messages are stored in a storage (e.g., a register) at the interface 365. The control plane 325 retrieves data stored in this storage periodically or based on generated interrupts.

In some embodiments, the mirrored message that is provided to the control plane identifies the tracked connection that is apparently under a DDoS attack (i.e., that has exceeded its threshold). In some embodiments, the DDoS detector (e.g., the threshold comparator or the CP publisher) stores an identifier in this message that explicitly identifies this tracked connection. In other embodiments, the control plane extrapolates this identifier by comparing the attributes of the received data message with the tracked connection definitions that it stores.

After 440, the process ends.

In some embodiments, hash generators are scarce resource in the data plane. Thus, in these embodiments, it might not be desirable to generate a large number (e.g., 32, 64, 100, or 1000) of hashes for each data message that matches a tracked destination. These embodiments only generate a smaller subset of hashes for each matching data message, and then perform the max update based on these smaller subsets of hashes. For instance, in some embodiments, the pattern generator 322 generates only one hash value (e.g., a 64-bit hash value) for each data message that matches a tracked destination.

The max updater 324 in these embodiments then uses a part of this generated hash value (e.g., the final 10 bits) to select one register in the max register set 362 for the tracked destination. The max updater 324 then identifies the number of leading-zero values in the remaining values in the generated hash value (e.g., the first 54 bits), and determines whether this identified number is larger than the leading-zero value in the selected register (e.g., the register identified by the final 10 bits of the generated hash value). If not, the max updater 324 does not update the value stored in the selected register.

On the other hand, when the max updater determines that the identified non-leading zero value is larger than the leading-zero value in the selected register, the max updater 324 stores the identified leading-zero value in the selected register, computes a delta value (by differencing the identified leading-zero value from the value previously stored in the selected register), and stores this delta value in the header vector for the adder 326 (implemented by a subsequent MAU stage) to add to the value in the sum register 364 for the matched destination. The threshold comparator 328 then performs its thresholding operation based on new value stored in this sum register, and directs the CP publisher 158 to notify the control plane when the stored sum value exceeds a threshold that the comparator 128 monitors.

Some embodiments generate the same hash values and/or select the same portions of the generated hash values for identifying registers or for performing the leading-zero value computation, in order to ensure that the bit pattern that they generate (e.g., to ensure that the leading-zero values maintained by the max updater 324) are the same for different data messages that are part of the same data message flow. This ensures that different data messages of the same message flow do not modify the unique data message flow estimate that is approximated by the generated bit pattern.

Figure 5:
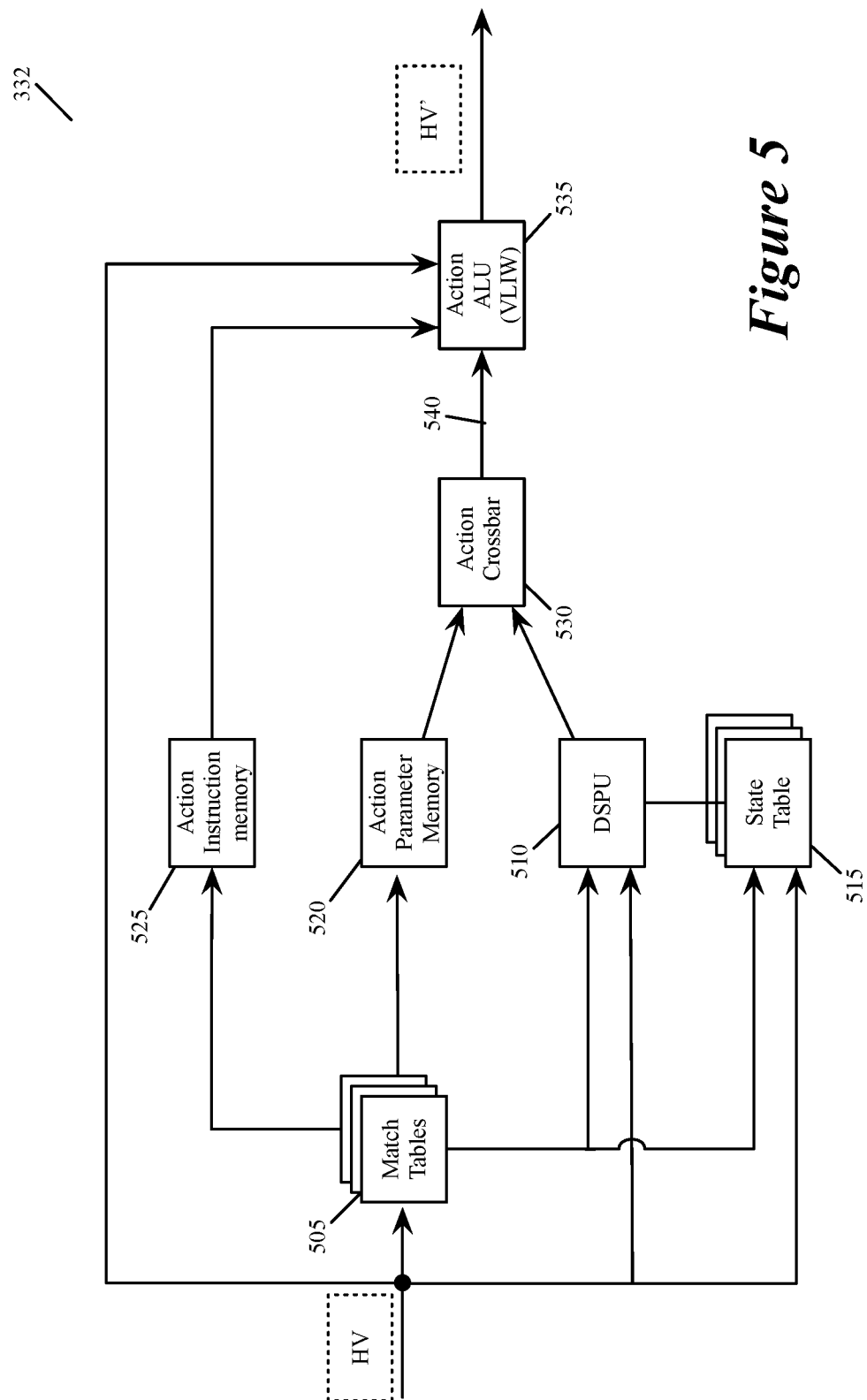
FIG. 5 illustrates an example of a match-action unit of some embodiments.

FIG. 5 illustrates an example of a match action unit 332 of some embodiments. As mentioned above, an ingress pipeline 340 or egress pipeline 342 in some embodiments has several MAU stages 332, each of which includes message-processing circuitry for forwarding received data messages and/or performing stateful operations based on these data messages. These operations are performed by processing values stored in the header vectors that are generated for the data messages. The stateful operations of the data plane are enabled by the data plane's ability to store data that it generates from processing earlier data messages for processing subsequent data messages. Specifically, the data plane can store DDoS statistic data (e.g., leading-zero values and leading-zero sum values), which allows the data plane to perform DDoS detection operations that rely on previous state data to determine whether a DDoS attack is taking place.

To perform stateful DDoS detection operations, each MAU stage 332 in some embodiments includes a data plane stateful processing unit (DSPU) 510 and a set of one or more stateful tables 515, as shown in FIG. 5. In addition to the DSPU 510 and stateful tables 515, the MAU stage 332 in some embodiments has a set of one or more match tables 505, an action crossbar 530, an action parameter memory 520, an action instruction memory 525, and an action arithmetic logic unit (ALU) 535.

The match table set 505 can compare one or more fields in a received message's header vector (HV) to identify one or more matching flow entries (i.e., entries that match the message's HV). The match table set 505 can include TCAM tables or exact match tables in some embodiments. In some embodiments, the match table set can be accessed at an address that is a value extracted from one or more fields of the message's header vector, or it can be a hash of this extracted value. In some embodiments, the local control plane or a remote controller supplies flow entries (e.g., the flow-match identifiers and/or action identifiers), to store in one or more match tables and associated action tables. In some embodiments, the match table set 505 of one MAU stage 332 serves as the tracked connection storage. When a data message's attributes (as stored in its associated header vector) match a record in the tracked connection in the match table set, the matched record's corresponding action (e.g., as specified by the action instruction memory 525 or action parameter memory 520) indicates that the action ALU 535 record the matching tracked connection's attribute (e.g., its identifier) in the header vector for the subsequent DDoS detector components and possibly for the control plane notifications.

In some embodiments, the value stored in a match table record that matches a message's flow attributes, or that is accessed at a hash-generated address from one or more message flow attributes, provides addresses of records to access in the action parameter memory 520 and action instruction memory 525. The actions performed by the MAU stage 332 can include actions that the forwarding element has to perform on a received data message to process the data message (e.g., to drop the message, or to forward the message to its destination machine or to other intervening forwarding elements). In some embodiments, these actions can also include the DDoS detection operations described above for the connection tracker 352, pattern generator 322, max updater 324, adder 326 and threshold comparator 328.

Also, in some embodiments, the value stored in a match table record that matches a message's flow identifier, or that is accessed at a hash-generated address, can provide an address and/or parameter for one or more records in the stateful table set 515, and can provide an instruction and/or parameter for the DSPU 510. As shown, the DSPU 510 and the stateful table set 515 also receive a processed message's header vector. The header vectors can include instructions and/or parameters for the DSPU, while containing addresses and/or parameters for the stateful table set 515.

The DSPU 510 in some embodiments performs one or more stateful operations, while a stateful table 515 stores state data used and generated by the DSPU 510. In some embodiments, the DSPU is a programmable arithmetic logic unit (ALU) that performs operations synchronously with the data flow of the message-processing pipeline (i.e., synchronously at the data line rate of the data plane 320). As such, the DSPU can process a different header vector on every clock cycle, thus ensuring that the DSPU would be able to operate synchronously with the dataflow of the message-processing pipeline.

In some embodiments, the MAU DSPU 510 implements the max updater 324 or adder 326 of the DDoS detector 350, and the maximum leading-zero values or the leading-zero sums maintained by the max updater 324 or adder 326 are stored in the stateful tables 515 of this DSPU. In some embodiments, a DSPU performs every computation with fixed latency (e.g., fixed number of clock cycles). Examples of such operations include (1) identifying and storing maximum leading-zero values in bit patterns generated by the hash generators of the MAU 332 or prior MAUs 332, (2) computing delta values between new and old leading-zero values, and/or (3) computing and storing new leading-zero sum values from previously stored leading-zero sum values and computed delta values.

In some embodiments, some of these operations (e.g., computing the delta values) are performed by the action ALU 535, which will be further described below. In other embodiments, the DSPUs perform other operations of the DDoS detector 350. For instance, in some embodiments, the DSPU performs the threshold operation that compares a new leading-zero sum value to a threshold value. In other embodiments, an action ALU 535 (of the same stage or a subsequent stage) performs this thresholding operation (acts as the threshold comparator) after the DSPU (acting as the adder 326) provides a new leading-zero sum.

In some embodiments, the local or remote control plane provides configuration data to program the DSPUs 510 of the MAUs 332 of the data plane 320. The DSPU 510 outputs an action parameter to the action crossbar 530. The action parameter memory 520 also outputs an action parameter to this crossbar 530. The action parameter memory 520 retrieves the action parameter that it outputs from its record that is identified by the address provided by the match table set 505. The action crossbar 530 in some embodiments maps the action parameters received from the DSPU 510 and action parameter memory 520 to an action parameter bus 540 of the action ALU 535. This bus provides the action parameter to this ALU 535. For different data messages, the action crossbar 530 can map the action parameters from DSPU 510 and memory 520 differently to this bus 540. The crossbar can supply the action parameters from either of these sources in their entirety to this bus 540, or it can concurrently select different portions of these parameters for this bus.

The action ALU 535 also receives an instruction to execute from the action instruction memory 525. This memory 525 retrieves the instruction from its record that is identified by the address provided by the match table set 505. The action ALU 535 also receives the header vector for each message that the MAU processes. Such a header vector can also contain a portion or the entirety of an instruction to process and/or a parameter for processing the instruction.

The action ALU 535 in some embodiments is a very large instruction word (VLIW) processor. The action ALU 535 executes instructions (from the instruction memory 525 or the header vector) based on parameters received on the action parameter bus 540 or contained in the header vector. The action ALU stores the output of its operation in the header vector in order to effectuate a message forwarding operation and/or stateful operation of its MAU stage 332. The output of the action ALU forms a modified header vector (HV') for the next MAU stage. In some embodiments, examples of such actions include the writing of the outputs of the connection tracker 352, delta leading-zero values, and/or leading-zero sum values in the header vectors.

In other embodiments, the match tables 505 and the action tables 515, 520 and 525 of the MAU stage 332 can be accessed through other methods as well. For instance, in some embodiments, each action table 515, 520 or 525 can be addressed through a direct addressing scheme, an indirect addressing scheme, and an independent addressing scheme. The addressing scheme that is used depends on the configuration of the MAU stage, which in some embodiments, is fixed for all data messages being processed, while in other embodiments can be different for different data messages being processed.

In the direct addressing scheme, the action table uses the same address that is used to address the matching flow entry in the match table set 505. As in the case of a match table 505, this address can be a hash generated address value or a value from the header vector. Specifically, the direct address for an action table can be a hash address that a hash generator (not shown) of the MAU generates by hashing a value from one or more fields of the message's header vector. Alternatively, this direct address can be a value extracted from one or more fields of the header vector.

On the other hand, the indirect addressing scheme accesses an action table by using an address value that is extracted from one or more records that are identified in the match table set 505 for a message's header vector. As mentioned above, the match table records are identified through direct addressing or record matching operations in some embodiments.

The independent address scheme is similar to the direct addressing scheme except that it does not use the same address that is used to access the match table set 505. Like the direct addressing scheme, the table address in the independent addressing scheme can either be the value extracted from one or more fields of the message's header vector, or it can be a hash of this extracted value. In some embodiments, not all the action tables 515, 520 and 525 can be accessed through these three addressing schemes, e.g., the action instruction memory 525 in some embodiments is accessed through only the direct and indirect addressing schemes.

In some embodiments, the control plane 325 of the forwarding element 300 configures the MAU stages 332 of the data plane 320 of this forwarding element 300 to implement not only the forwarding operations of these MAU stages, but also the DDoS detection operations that some of these MAU stages 332 perform. To configure the DDoS detection operations, the control plane 325 in some embodiments provides the tracked connection identifiers for storing in the tracked connection storage 360. As mentioned above, the match tables 505 of one or more MAU stages 332 in some embodiments implement the connection tracker 352 and tracked connection storage 360. Thus, in these embodiments, the tracked connection identifiers are stored in the match tables 505.

Also, to configure the DDoS detection operations, the control plane 325 in some embodiments further provides the threshold values for the different tracked connections to the MAU stage that implement the threshold comparator 328. These threshold values can be stored in different tables (e.g., match tables 505 or state table 515) in different embodiments depending on the implementation of the threshold comparator in these embodiments. As mentioned above, the threshold comparator in some embodiments is implemented by the DSPU 510 of an MAU stage, while in other embodiments it is implemented by the action ALU 535 of an MAU stage.

To further facilitate the DDoS detection operations, the control plane 325 periodically resets the leading-zero maximum registers 362 and leading-zero sum registers 364 for one or more tracked connections. Conjunctively, or alternatively, a message generator (not shown) in the data plane 320 periodically generates register reset messages that are converted to register-reset header vectors that direct the MAUs (e.g., the MAUs that implement the max updater 324 and adder 326) to reset the leading-zero maximum registers 362 and leading-zero sum registers 364 for one or more tracked connections. In some embodiments, these registers are periodically or on-demand reset because, as mentioned above, the statistical estimates stored in these registers are only valid estimates of the unique message flows when the data is viewed over a particular duration of time. The statistical estimates become stale and inaccurate when these estimates are examined over a larger duration of time.

The control plane 325 performs different operations in different embodiments after receiving a DDoS attack signal for a tracked connection. For instance, in some embodiments, the control plane 325 configures the MAU stages 332 of the data plane 320 to duplicate the data messages directed to the tracked destination associated with the DDoS attack signal, and direct the duplicate messages to a DDoS detection/mitigation machine (e.g., VM, container, appliance, etc.) or machine cluster. In this document, this duplication and redirection is referred to as mirroring. Instead of mirroring the data messages, the control plane 325 in other embodiments reconfigures the MAU stages to just redirect to a DDoS detection/mitigation machine/cluster the messages that are directed to the tracked connection associated with the DDoS attack signal. This redirection in some embodiments changes the next hop of these messages to be the DDoS detection/mitigation machine/cluster.

In some embodiments, the control plane 325 reconfigures the DDoS detector 350 to collect additional information regarding a potential attack. Specifically, the control plane 325 in some embodiments starts an iterative DDoS attack collection process in which it iteratively reconfigures the DDoS detector to iteratively collect attack-related information with more granularity in order to gain better insight into the attack (e.g., to identify the source or the destination of the attack with more precision). In some embodiments, the control plane 325 can also set successive different threshold levels regarding the message flows directed to a tracked destination that is potentially under attack. These different threshold levels allow the control plane's iterative process to converge more quickly in some embodiments.

Figure 6:
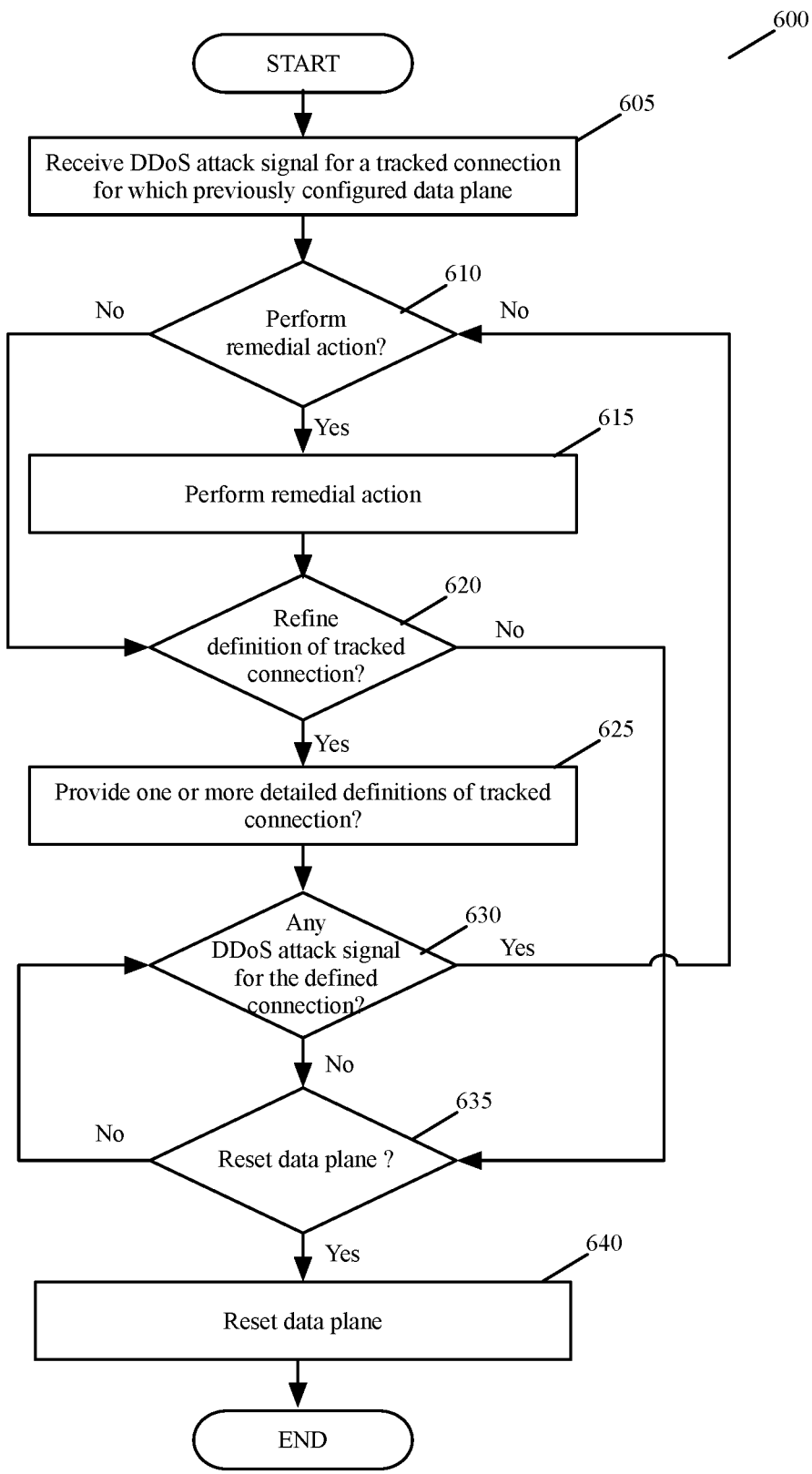
FIG. 6 presents an exemplary conceptual illustration of one such iterative DDoS-attack collection process of the control plane.

FIG. 6 presents an exemplary conceptual illustration of one such iterative DDoS attack collection process 600 of the control plane 325. This process is a program that is stored in the control plane memory 394 and that is executed by the control plane processor(s) 392. Before the process 600 starts, the control plane has configured the DDoS detector 350 of the data plane 320 for a particular tracked connection. This configuration provides a particular definition of the tracked connection to the data plane for storage in the tracked connection storage 360. For this connection, the configuration in some embodiments also provides a threshold value for the threshold comparator 328 of the data plane 320 to use to identify a potential DDoS attack (i.e., determine when the estimated number of unique data message flows that match the tracked connection exceed the threshold value).

As shown, the process 600 initially receives (at 605) a DDoS attack signal for the tracked connection. In some embodiments, the control plane receives this attack signal as part of a message that it receives from the interface 365, by periodically polling this interface or by receiving an interrupt from this interface. As mentioned above, when the threshold comparator 328 determines that a received message has caused the unique flow estimate for a tracked connection to exceed its configured threshold value, the comparator in some embodiments marks a field in the message's header vector and this marking directs the traffic manager's message replicator 375 to replicate the received data message, insert the DDoS attack signal in the message copy, and direct this copy to the egress port 115 associated with the data/control plane interface 365.

At 610, the process 600 determines whether it should configure the data plane to perform a remedial action, such as mirroring, redirecting, or dropping data messages that are directed to the tracked connection. If not, the process transitions to 620, which will be described below. On the other hand, when the process determines (at 610) that it should reconfigure the data plane, the process 600 configures (at 615) the data plane 320 to perform the desired remedial action. In some embodiments, the process 600 only reconfigures the data plane to perform a remedial action when the process 600 has defined the tracked connection at a particular granularity and not at the first or first few definitions of the tracked connection.

From 615, the process transitions to 620. At 620, the process determines whether it needs to refine the definition of the tracked connection. As mentioned above, the control plane iteratively specifies the definition of a tracked connection (e.g., the source and/or destination addresses) at greater and greater levels of detail in order to get additional insight into an attack (e.g., in order to particularly identify a source of an attack, or a specific destination for the attack).

If the process determines (at 620) that it does not need to provide a more detailed definition of the tracked connection, it transitions to 635, which will be further described below. Otherwise, at 625, it provides to the DDoS detector 350 a more detailed definition of the tracked connection. This new, more detailed definition is treated as a new tracked connection in some embodiments. As further described below, the process 600 provides multiple more detailed tracked connection definitions for multiple tracked connections that are subsets of the tracked connection for which the DDoS signal is generated (at 605 or later at 630).

With the new more detailed tracked connection definitions, the process also directs (at 625) the DDoS detector 350 to remove from the tracked connection storage 360 the tracked connection definition for the earlier tracked connection that resulted in the generated DDoS attack signal. In the embodiments in which the process provides multiple related, more detailed tracked connection definitions for an earlier tracked connection that resulted in a generated DDoS attack signal, the process directs (at 625) the DDoS detector 350 to remove the multiple related detailed tracked connection definitions when the process subsequently (1) receives a DDoS attack signal for one of these more detailed tracked connection definitions, and (2) provides the DDoS detector with new more detailed tracked connection definitions based on the tracked connection definition that received the subsequent DDoS attack signal.

For each newly defined tracked connection, the process 600 in some embodiments provides (at 625) a threshold value to the DDoS detector 350 so that the threshold comparator 328 can use this threshold value to determine whether an attack is under way for the tracked connection. The threshold value for a newly defined tracked connection in some embodiments is the same as the threshold value for the earlier defined, related tracked connection that is associated with the DDoS attack signal. Alternatively, in other embodiments, the process 600 sets lower threshold values for later defined tracked connections that are generated for earlier defined tracked connections for which DDoS attack signals have been generated. These lower threshold values allow the DDoS detector to more quickly identify a potential DDoS attack for the later defined tracked connections that are related to earlier defined tracked connections that resulted in a DDoS attack signal. This quicker identification allows the process 600 to more quickly reach a desired level of specificity for the definition of the tracked connection that is under attack.

Figure 7:
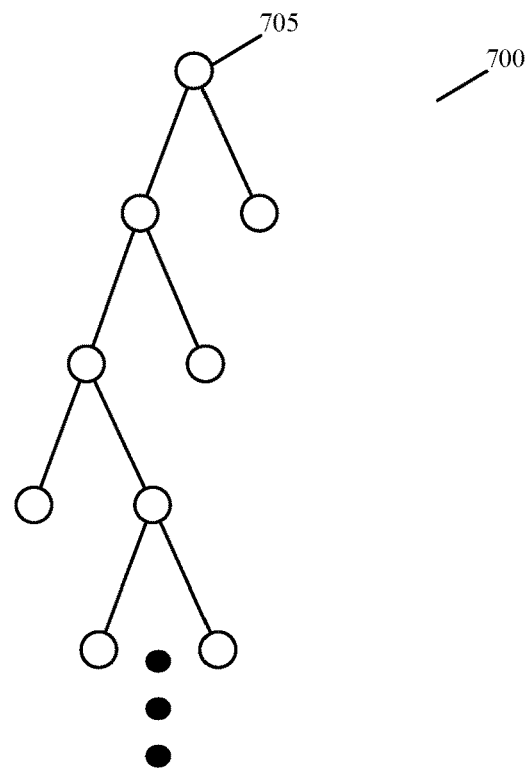
FIGS. 7 and 8 illustrate two search graphs used by the control plane to iteratively define tracked connections.
Figure 8:
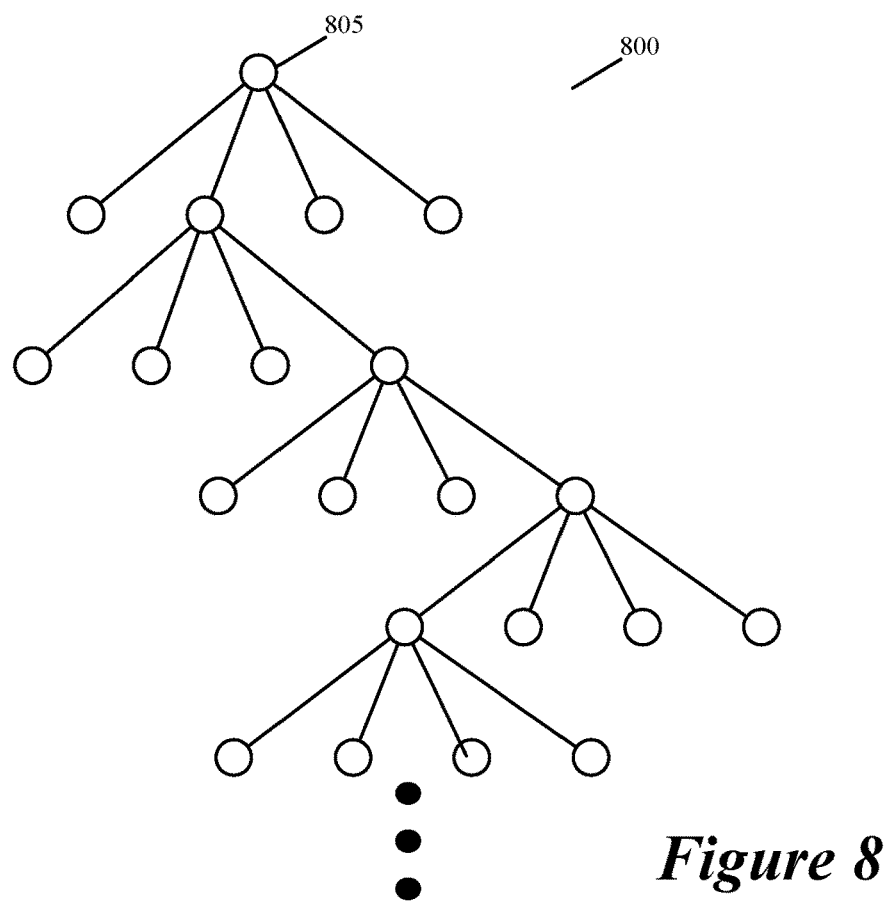

To identify tracked connection definitions iteratively at more granular levels, the process 600 uses a search graph in some embodiments. FIGS. 7 and 8 illustrate two examples of such search graphs 700 and 800 that the process 600 creates in different embodiments to iteratively further define a tracked connection that is associated with a detected DDoS attack. Each node in each of these graphs corresponds to a tracked connection definition. A root node 705 or 805 of each graph corresponds to the tracked connection definition that the control plane provides the DDoS detector 350 before the start of the process 600. The tracked connection definitions associated with all other nodes is a more specific version of the original tracked connection definition represented by the root node. Also, each child node's associated tracked connection definition is a more detailed version of the tracked connection definition of the parent node of the child node.

The search graph in FIG. 7 is a binary search tree 700 in which each non-leaf node only has two child nodes, while the graph in FIG. 8 is a quad search tree 800 in which each non-leaf node only has four child nodes. When the binary search tree is used to further define an IP address (e.g., a source IP address) associated with a detected DDoS attack, each level in this tree in some embodiments is only used to further define one additional bit of the IP address at a time. Each level of the quad search tree, on the other hand, can be used to define two additional bits of an IP address, when this tree is used to further define the IP address. However, the use of the quad search tree would require four more detailed tracked connections to be pushed to the DDoS detector in each iteration, while the binary search tree would only require two more detailed tracked connections to be pushed to this detector in each iteration. The additional tracked connections for the quad search tree approach would require the DDoS detector to consume more resources, or to remove some of the other previously defined tracked connections.

Either of these search trees 700 or 800 can be used to further define any aspect of a tracked connection's definition, e.g., to further define a source IP address, a destination IP address, a source port, a destination port, a protocol, or any other header value associated with a data message flow or a set of data message flows. For example, the initially configured tracked connection (associated with root node 705 or 805) can define the connection just in terms of a partial destination IP address (195.162.10.*), and the subsequently defined tracked connections (associated with the non-root nodes of the trees 700 or 800) can define the remainder of this destination IP address. The process 600 could use this approach when the control plane initially defines a subnet for DDoS attack protection. Once the process identifies that at least one computer in a subnet is under attack, the process uses the search tree 700 or 800 to identify the specific machine or machines under attack.

In another example, the initially configured tracked connection (associated with root node 705 or 805) can define the connection just in terms of the destination IP address; and the subsequently defined tracked connections (associated with the non-root nodes of the trees 700 or 800) can partially or fully define the source IP address for different data message flows to the destination IP address. The process 600 would use this approach when the control plane needs to identify the source of a DDoS attack after initially identifying a DDoS attack to a particular destination IP address.

At 630, the process determines whether it has received a DDoS attack signal for a defined tracked connection (e.g., one that originally set or one that was defined previously provided at 625). If so, the process returns to 610 to repeat its operation for the newly received DDoS attack signal and its associated tracked connection. Otherwise, the process determines (at 635) whether it should reset the data plane for the tracked connection(s) that the process 600 is currently handling. When the process determines (at 635) that it should not reset the data plane, it returns to 630. The process loops through 630 and 635 until it receives another DDoS attack signal or it determines that it should reset the data plane.

When the process determines (at 635) that it should reset the data plane, it transitions to 640 to reset the data plane, and then end. In some embodiments, this resetting entails setting the leading-zero max register set and the leading-zero sum register for the current tracked connection(s) that the process 600 is currently managing. In other embodiments, this resetting entails removing these tracked connection(s) from the tracked connection storage 360. When the current tracked connection or connections are more detailed connections than the initial connection with which the DDoS detector was configured before the start of the process 600, the resetting in some embodiments entails replacing in the tracked connections storage 360 the current tracked connection(s) with the initially configured tracked connection.

While the invention has been described with reference to numerous specific details, one of ordinary skill in the art will recognize that the invention can be embodied in other specific forms without departing from the spirit of the invention. For instance, while several of the above-described embodiments perform thresholding operations in the data plane, other embodiments perform all the thresholding operations in the control plane. For instance, in some embodiments, the control plane obtains data plane generated statistics, analyzes these statistics to determine that a threshold has been crossed, and then use the iterative, graph-based search process of FIGS. 6-8 to define additional connections to track in the data plane.

Some embodiments use alternative mechanisms to export statistics or thresholding results from the data plane to the control plane. For example, in some embodiments, a message generator in the data plane periodically generates messages that pass through the data plane to capture data plane generated DDoS statistics and thresholding results. These messages are then directed to the data/control plane interface 365 for retrieval by the control plane. Alternatively, in other embodiments, these messages are forwarded by the forwarding element to remote controllers for analysis.

The above-described embodiments compute leading-zero values and store maximum leading-zero values and the sums of these values. In other embodiments, the DDoS detectors compute leading-one values and store maximum leading-one values and the sums of these values. Also, the DDoS detector 150 or 350 in some embodiments is implemented in a middlebox appliance, such as a firewall appliance, load balancing appliance, intrusion detection appliance, intrusion prevention appliance, a DDoS detector, etc. Furthermore, the approach used by these DDoS detectors are implemented in software forwarding elements, software service VMs or containers, or other software modules in some embodiments.

In several embodiments described above, each tracked destinations is identified by reference to full or partial destination network addresses (e.g., full or partial destination IP address that specify a specific IP address or a destination IP subnet). In other embodiments, a tracked destination can be specified differently. For instance, in some embodiments, an arbitrary identifier that represents a set of destinations can specify a destination. This identifier in some embodiments is derived from some header fields by using a mapping table of the forwarding element to map these header values to the identifier, or through some other mechanism (such as a hash). Accordingly, one of ordinary skill in the art would understand that the invention is not to be limited by the foregoing illustrative details, but rather is to be defined by the appended claims.

The invention claimed is:

1. A network forwarding element comprising:
a data-plane circuit comprising:
  a plurality of data processing stages to process data tuples associated with data messages received by the network forwarding element in order to forward data messages; and
  a distributed denial of service (DDoS) attack detector in the data-plane circuit to detect a DDoS attack of a tracked set of one or more destinations, wherein identifiers of the tracked set of one or more destinations are configured by a control-plane circuit, wherein the plurality of data processing stages comprise a pipeline of two or more sequential match-action circuitries that are configurable with match-action entries, wherein one or more of the match-action circuitries is to perform the DDoS attack detector, and wherein one or more other match-action circuitries is to perform forwarding operations related to selection from forwarding to a next hop and forwarding to the control-plane circuit;
wherein:
  the distributed DDoS attack detector is configurable to perform an iterative data collection process to iteratively collect attack related information with increasing granularity relative to initial granularity;
  the iterative data collection process is for use in identifying a DDoS attack destination with increasing precision relative to initial precision;
  the control-plane circuit is to set successive threshold levels associated with one or more tracked destination message flows related to the DDoS attack; and
  the one or more tracked destination message flows are associated with the tracked set of one or more destinations.

2. The network forwarding element of claim 1, wherein the DDoS attack detector performed by the match-action circuitries is to perform:
  a statistics generator to compute statistics regarding a number of data message flows that are directed to at least one of the tracked set of one or more destinations; and
  a statistics analyzer to generate a DDoS attack signal based on maintained statistics for the at least one of the tracked set of one or more destinations.

3. The network forwarding element of claim 2, wherein the number of data message flows that the statistics generator computes for the at least one of the tracked set of one or more destinations comprises an estimated number of data message flows that are directed to the at least one of the tracked set of one or more destinations.

4. The network forwarding element of claim 2, wherein the DDoS attack detector further comprises a destination tracker to determine whether a received data message is directed to the at least one of the tracked set of one or more destinations.

5. The network forwarding element of claim 2, wherein the statistics generator is to generate a bit pattern for the at least one of the tracked set of one or more destinations and is to update the bit pattern based on received unique data message flows that are directed to the at least one of the tracked set of one or more destinations, said bit patterns used to estimate the number of data message flows that are directed to the at least one of the tracked set of one or more destinations.

6. The network forwarding element of claim 2, wherein the statistics generator is to generate a bit pattern for a tracked destination by: generate a plurality of hashes for a particular data message flow associated with the tracked destination, identify leading numbers of a particular bit value in each hash, and use at least one of the identified leading numbers to update the bit pattern for the tracked destination.

7. The network forwarding element of claim 1 further comprising the control-plane circuit to configure the data-plane circuit.

8. The network forwarding element of claim 7, wherein the data-plane circuit is to provide a DDoS attack signal to the control-plane circuit based on the DDoS attack detector identifying a tracked destination DDoS attack.

9. The network forwarding element of claim 8, wherein the data-plane circuit further is to provide, to the control-plane circuit, data to identify a tracked destination DDoS attack destination.

10. A data-plane integrated circuit (IC) for a network forwarding element, the data-plane IC comprising:
  a plurality of data processing stages to process data tuples associated with data messages received by the network forwarding element in order to forward data messages; and
  a distributed denial of service (DDoS) attack detector in the data-plane IC to detect a DDoS attack of a tracked set of one or more destinations in a network, wherein identifiers of the tracked set of one or more destinations are configured by a control-plane circuit, wherein the plurality of data processing stages comprise two or more serial match-action circuitries that are configurable with match-action entries, wherein one or more of the match-action circuitries is to perform the DDoS attack detector, and wherein one or more other match-action circuitries is to perform forwarding operations related to selection from forwarding to a next hop and forwarding to the control-plane circuit;
wherein:
  the distributed DDoS attack detector is configurable to perform an iterative data collection process to iteratively collect attack related information with increasing granularity relative to initial granularity;
  the iterative data collection process is for use in identifying a DDoS attack destination with increasing precision relative to initial precision;
  the control-plane circuit is to set successive threshold levels associated with one or more tracked destination message flows related to the DDoS attack; and
  the one or more tracked destination message flows are associated with the tracked set of one or more destinations in the network.

11. The data-plane IC of claim 10, wherein the DDoS attack detector comprises:
  a statistics generator to compute statistics regarding a number of data message flows that are directed to at least one of the tracked set of one or more destinations; and
  a statistics analyzer to generate a DDoS attack signal based on maintained statistics for a tracked destination of the tracked set of one or more destinations.

12. The data-plane IC of claim 11, wherein the number of data message flows that the statistics generator computes for at least one of the tracked set of one or more destinations comprises an estimated number of data message flows that are directed to the tracked destination.

13. The data-plane IC of claim 11, wherein the DDoS attack detector further comprises a destination tracker to determine whether a received data message is directed to a tracked destination of the tracked set of one or more destinations.

14. The data-plane IC of claim 11, wherein the statistics generator is to generate a bit pattern for the at least one of the tracked set of one or more destinations and is to update the bit pattern based on received unique data message flows that are directed to the at least one of the tracked set of one or more destinations, said bit patterns used to estimate the number of data message flows that are directed to the at least one of the tracked set of one or more destinations.

15. The data-plane IC of claim 11, wherein the statistics generator is to generate a bit pattern for a tracked destination by: generate a plurality of hashes for a data message flow associated with the tracked destination, identify leading numbers of a particular bit value in each hash, and use at least one of the identified leading numbers to update the bit pattern maintained for the tracked destination.

16. The data-plane IC of claim 10 further comprising the control-plane circuit to configure the data-plane forwarding IC.

17. The data-plane IC of claim 16, wherein the data-plane forwarding IC is to provide a DDoS attack signal to the control-plane circuit based on the DDoS attack detector identifying a tracked destination DDoS attack.

18. The data-plane IC of claim 17, wherein the data-plane forwarding circuit is to further provide, to the control-plane circuit, data to identify a tracked destination DDoS attack destination.

19. A method performed by a data-plane of a network device, the data-plane comprising two or more serial match-action circuitries that are configurable with match-action entries, the method comprising:
  processing data tuples associated with received data messages using one or more match-action circuitries of the data-plane in order to forward data messages to either a next hop or to a control-plane circuit and
  detecting a distributed denial of service (DDoS) attack, using one or more other match-action circuitries of the data-plane as a distributed DDoS attack detector, to detect a DDoS attack of a tracked set of one or more destinations, wherein identifiers of the tracked set of one or more destinations are identified by the control-plane circuit;
  wherein:
    the distributed DDoS attack detector is configurable to perform an iterative data collection process to iteratively collect attack related information with increasing granularity relative to initial granularity;
    the iterative data collection process is for use in identifying a DDoS attack destination with increasing precision relative to initial precision;
    the control-plane circuit is to set successive threshold levels associated with one or more tracked destination message flows related to the DDoS attack; and
    the one or more tracked destination message flows are associated with the tracked set of one or more destinations.

20. The method of claim 19, comprising:
  the one or more other match-action circuitries of the data-plane performing:
    computing statistics regarding a number of data message flows that are directed to at least one of the tracked set of one or more destinations; and
    generating a DDoS attack signal based on maintained statistics for a tracked destination of the tracked set of one or more destinations.

* * * * *